(12) United States Patent
Doi et al.

(10) Patent No.: US 8,400,959 B2
(45) Date of Patent: Mar. 19, 2013

(54) RADIO COMMUNICATION METHOD AND RADIO COMMUNICATION DEVICE

(75) Inventors: Hiroshi Doi, Osaka (JP); Taisuke Matsumoto, Sunnyvale, CA (US); Kazuaki Takahashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 758 days.

(21) Appl. No.: 12/439,529

(22) PCT Filed: Sep. 3, 2007

(86) PCT No.: PCT/JP2007/067120
§ 371 (c)(1),
(2), (4) Date: Mar. 25, 2009

(87) PCT Pub. No.: WO2008/026760
PCT Pub. Date: Mar. 6, 2008

(65) Prior Publication Data
US 2009/0262710 A1    Oct. 22, 2009

(30) Foreign Application Priority Data

| Sep. 1, 2006 | (JP) | 2006-238286 |
| Mar. 9, 2007 | (JP) | 2007-060789 |
| Aug. 31, 2007 | (JP) | 2007-225675 |

(51) Int. Cl.
*H04B 7/212* (2006.01)
(52) U.S. Cl. ........................ 370/324; 370/336
(58) Field of Classification Search .......... 370/336, 370/324
See application file for complete search history.

(56) References Cited

U.S. PATENT DOCUMENTS

| 4,995,055 | A | 2/1991 | Weinberger |
| 5,748,677 | A * | 5/1998 | Kumar ............... 375/285 |
| 5,864,550 | A * | 1/1999 | Posti ................. 370/338 |
| 6,480,522 | B1 * | 11/2002 | Hoole et al. ......... 375/130 |
| 2001/0039181 | A1 | 11/2001 | Spratt |
| 2004/0053621 | A1 | 3/2004 | Sugaya |
| 2004/0264403 | A1 * | 12/2004 | Fette et al. ......... 370/328 |
| 2005/0232312 | A1 * | 10/2005 | Suzuki ............... 370/913 |

(Continued)

FOREIGN PATENT DOCUMENTS

| JP | 2-39641 | 2/1990 |
| JP | 2001-298406 | 10/2001 |

(Continued)

OTHER PUBLICATIONS

International Search Report dated Nov. 13, 2007.

(Continued)

*Primary Examiner* — Sai-Ming Chan
(74) *Attorney, Agent, or Firm* — Dickinson Wright PLLC

(57) ABSTRACT

Provided is a radio communication method capable of optimally using the wide-band communication enabled time while maintaining power saving in an ad hoc network. According to this method, in the ad hoc network using the wide-band communication and a narrow-band communication, transmission and output of the narrow-band synchronization tone signal and the resynchronization tone signal are controlled so that the reach radius of the narrow-band synchronization signal and the resynchronization tone signal exceeds the reach radius of the wide-band signal (milli-wave UWB signal). Thus, when radio communication devices pass by each other, super frame synchronization is completed before reaching the wide-band communication enabled range of the ad hoc network, thereby optimally using the wide-band communication-enabled time.

8 Claims, 32 Drawing Sheets

U.S. PATENT DOCUMENTS

| | | | |
|---|---|---|---|
| 2006/0030343 A1* | 2/2006 | Ebner et al. | 455/502 |
| 2006/0120319 A1 | 6/2006 | Omori | |
| 2006/0240789 A1* | 10/2006 | Rosnell et al. | 455/127.4 |
| 2007/0026880 A1 | 2/2007 | Doi | |
| 2008/0057863 A1* | 3/2008 | Jalali | 455/13.2 |

FOREIGN PATENT DOCUMENTS

| | | |
|---|---|---|
| JP | 2004-40645 | 2/2004 |
| JP | 2004-221896 | 8/2004 |
| JP | 2005-223443 | 8/2005 |
| JP | 2005-318505 | 11/2005 |
| WO | 99/026361 | 5/1999 |
| WO | 2004/038959 | 5/2004 |
| WO | 2006/025171 | 3/2006 |

OTHER PUBLICATIONS

Y. Zang, et al., "Towards High Speed Wireless Personal Area Network-Efficiency Analysis of MBOA MAC," Proceedings of International Workshop on Wireless Ad-Hoc Networks 2005 (IWWAN 2005), London, UK, 2005, May 2005, 10 pages total.

Japanese Office Action dated Feb. 28, 2012.

Japanese Office Action dated Nov. 8, 2011.

* cited by examiner

| SLOT NUMBER | DEVICE ID | USE STATE | TYPE |
|---|---|---|---|
| 1 | A | 0 | BEACON |
| 2 | B | 0 | BPOIE |
| 2 | E | 0 | BEACON |
| 3 | C | 0 | BPOIE |
| 4 | D | 0 | BEACON |
| 5 | F | 0 | BEACON |
| 6 | 0 | 0 | 0 |
| 7 | 0 | 0 | 0 |
| 8 | 0 | 0 | 0 |

FIG.19

RADIO COMMUNICATION METHOD AND RADIO COMMUNICATION DEVICE

TECHNICAL FIELD

The present invention relates a wireless communication network. More particularly, the present invention relates to ad-hoc network communication in a mobile environment.

BACKGROUND ART

Recently, wireless systems of UWB (Ultra Wide Band) (hereinafter simply "UWB") in the microwave frequency band covering wideband signals equal to or more than 500 MHz, and UWB (hereinafter "millimeter wave UWB") in the millimeter wave frequency band that is able to cover signals of a wider band, are being developed. Accompanying this, various communication schemes are proposed as near-field wireless communication schemes. Above all, UWB of high transmission capacity is wideband communication exceeding the transmission speed of 1 Gbps and using carrier frequencies in the band equal to or more than 1 GHz. However, the transmission distance of UWB is very short compared to wireless LAN and is between 3 to 10 meters. Consequently, as an application of UWB, for example, connecting equipment possessed by individuals in a wide band is possible (PAN: Personal Area Network).

However, to speak of PAN in a word, PAN is in an early period and has difficulty in finding a possible application of PAN at ease because equipment utilizing the application generally requires greater power for wideband characteristics and it is difficult to move carrying a lot of batteries for PAN.

An example of the application that utilizes PAN and requires wideband characteristics of UWB is a file swapping application. Its basic operation principle is disclosed in, for example, Patent Document 1. By this means, a small community can be established through random file swapping (described as message exchange in Patent Document 1) in a mobile environment. Further, although not disclosed in Patent Document 1, data to be exchanged is not limited to text document and file swapping for music, images, moving images and software is also possible. Particularly, according to UWB, the effective transmission speed is between 100 Mbps and several Gbps, and so some files of a large size can be swapped when people pass each other, so that file swapping is a suitable application for UWB.

WiMedia, which is the industry standard of UWB, has finished standardization of UWB using multiband OFDM (Orthogonal Frequency Division Multiplexing) modulation scheme. The standardized scheme is a multi-beacon scheme using a beacon period. According to this scheme, synchronization between superframes is acquired by transmitting beacons from all terminals forming a network and swapping information between the terminals, and communication is performed by booking and maintaining a transmission and reception time slot (see Non-Patent Document 1).

However, it is very difficult to use this scheme in the crowd in which people pass each other, because this scheme employs a scheme of connecting the one entire beacon period to the other such that two groups passing each other acquire superframe synchronization. That is, according to this scheme, to be connected concurrently beacon periods between groups that pass each other, because beacon periods are connected concurrently between groups that pass each other, processing of connecting one entire beacon period to the end of the other beacon period is carried out and this processing requires time. For example, one group takes time to recognize the presence of the other group, time is also required to notify the presence of the other group to the superframe group entirely or partly (that is, a group of terminals that share the same superframe) and time is also required to make a move by coordinating timings. Further, until connection is finished, communication between terminals between groups is not completely impossible, but the time that can be utilized is reduced significantly. This configuration is not suitable for an application for performing file swapping upon passing, that is, for establishing frame synchronization in a short period and completing large volume data communication.

On the other hand, there is a scheme (tone signal synchronization scheme) for acquiring synchronization inside and outside superframe groups (that is, synchronization in a group and synchronization between groups) using an unmodulated narrowband tone signal instead of a wideband signal as in UWB. According to this scheme, by transmitting a narrowband signal having the same reachable range as the frame reachable range of UWB for a predetermined time length from each terminal, it is possible to acquire synchronization between superframe groups using the earliest start time of the narrowband signal as the boundary between the superframes. That is, is this scheme refers to a scheme for detecting between superframe groups a narrowband synchronized signal at one time in N laps of superframe during the superframe period or at the time the presence of other superframe groups is learned, and for synchronizing superframes at the time the narrowband synchronized signal is detected. Further, according to this scheme, wideband communication and narrowband communication are used in combination, so that it is possible to reduce power consumption.

This tone signal synchronization scheme does not need to transmit a beacon for synchronization, and, if reception checking step for surrounding devices is prepared, it is not necessary to modulate and transmit beacon signals from all nodes. Consequently, this scheme makes it possible to acquire synchronization (hereinafter, "resynchronization") with another superframe group at ease. That is, when synchronization is acquired in the tone signal synchronization scheme, groups can join together quickly compared to a case of a simple beacon period scheme. Consequently, this scheme is suitable for file swapping upon passing.

Patent Document 1: Japanese Patent Application Laid-Open No. 2001-298406

Non-Patent Document 1: "Towards High Speed Wireless Personal Area Network-Efficiency Analysis of MBOA MAC," Yunpeng Zang, etc., Internet URL: http://www.ecma-international.org/publications/standards/Ecma-368.htm

DISCLOSURE OF INVENTION

Problems to be Solved by the Invention

However, there is the following problem in the above tone signal synchronization scheme.

FIG. 1 shows an optimum state of passing when two terminals 10 and 20 pass each other in the tone signal synchronization scheme. Here, terminals 10 and 20 are possessed by different users walking at 3.6 kilometers per hour and has the possible radius of communication of 2 meters (i.e. communication radius in which communication of 1 Gpbs is possible in millimeter wave UWB). Further, in FIG. 1, one terminal 20 is fixed to point Q and other terminal 10 proceeds at 7.2 kilometers per hour ($\approx$2 meters per second) from point $P_1$ to point $P_2$.

In this case, if terminal 10 ideally detects a tone signal of other party (i.e. terminal 20) at point $P_1$ and succeeds in resynchronization, superframe synchronization is achieved between both terminals 10 and 20, and communication is possible between terminals 10 and 20 for about two seconds (=(2(m)×2)/2 (m/s)) when terminal 10 moves from point $P_1$ to point $P_2$.

On the other hand, FIG. 2 shows the worst state of passing when two terminals 10 and 20 pass each other in the tone signal synchronization scheme. Here, similar to the case of FIG. 1, both users who possess terminals 10 and 20 are at walking 3.6 kilometers per hour and the possible radius of communication is two meters. However, FIG. 2 shows a state where resynchronization is finished at a timing immediately before terminal 10 arrives at point $P_1$, and where terminal 10 cannot recognize the presence of other party (terminal 20) until the next resynchronization. In this way, if resynchronization fails at a timing of point $P_1$, terminal 10 has to wait for communication until the next chance for resynchronization comes, that is, waits for the superframe period (here, 64 ms) corresponding resynchronization superframe lap counts (here, 16 times). During this time, terminal 10 moves from point $P_1$ to point $P_3$ (the moving distance is 2 (m/s)× 0.064 (s)×16≈2 (m)). Consequently, in this case, if resynchronization succeeds at point $P_3$, the time for about two seconds when terminal 10 moves from point $P_3$ to point $P_2$ is the possible time of communication.

That is, the conventional tone signal synchronization scheme has a task that, depending on the resynchronization timing, communication is possible only for the time reduced to half at worst. In this case, the time lost corresponds to 1 giga bits, that is, to the communication time of about 125 mega bytes.

Further, under the same condition, for example, if users carry millimeter wave UWB terminals in their breast pockets, there is a high possibility that a millimeter wave does not permeate the human body, and therefore the possible range of communication is likely to form a semicircle that is opening forward. Therefore, in this case, there is a possibility that communication is not possible all the time while terminal 10 moves point $P_1$ to point $P_2$.

It is therefore an object of the present invention to provide a wireless communication apparatus and wireless communication method that, in ad-hoc network, makes it possible to keep saving electric power and utilize the possible time of wideband communication at maximum.

Means for Solving the Problem

The wireless communication apparatus according to the present invention is a wireless communication apparatus that carries out wideband communication with another wireless communication apparatus in an ad-hoc network, and includes: a narrowband communication section that transmits and receives a narrowband synchronized signal for realizing superframe synchronization; and a wideband communication section that transmits and receives a wideband data signal used in the wideband communication and employs a configuration where the narrowband communication section transmits the narrowband synchronized signal in an output such that a signal reachable range of the narrowband synchronized signal is greater than a signal reachable range of the wideband data signal.

The wireless communication method according to the present invention is a wireless communication method for carrying out wideband communication reciprocally between a plurality of wireless communication apparatuses in an ad-hoc network, and includes: transmitting a narrowband synchronized signal for realizing superframe synchronization; and transmitting a wideband data signal used in the wideband communication and the narrowband synchronized signal is transmitted such that a signal reachable range of the narrowband synchronized signal is greater than a signal reachable range of the wideband data signal.

Advantageous Effect of the Invention

The present invention makes it possible to keep saving electric power and utilize the possible time of wideband communication at maximum in ad-hoc network.

That is, according to the present invention, when wireless communication apparatuses (for example, millimeter wave UWB terminals) pass each other, the wireless communication apparatuses carry out operations for finishing superframe synchronization before the wireless communication apparatuses reach the possible range of wideband communication of ad-hoc network and detecting the communicating party, so that it is possible to utilize the period in the possible range of wideband communication (i.e. possible time of wideband communication) at maximum.

BRIEF DESCRIPTION OF DRAWINGS

FIG. 19 shows a format of a beacon slot state table according to Embodiment 2;

BEST MODE FOR CARRYING OUT THE INVENTION

Hereinafter, embodiments of the present invention will be described in detail with reference to the accompanying drawings. Further, a wireless communication apparatus carries out data communication using millimeter wave UWB. Further, a wireless communication apparatus will be simply referred to as a "terminal."

Embodiment 1

Figure 3:
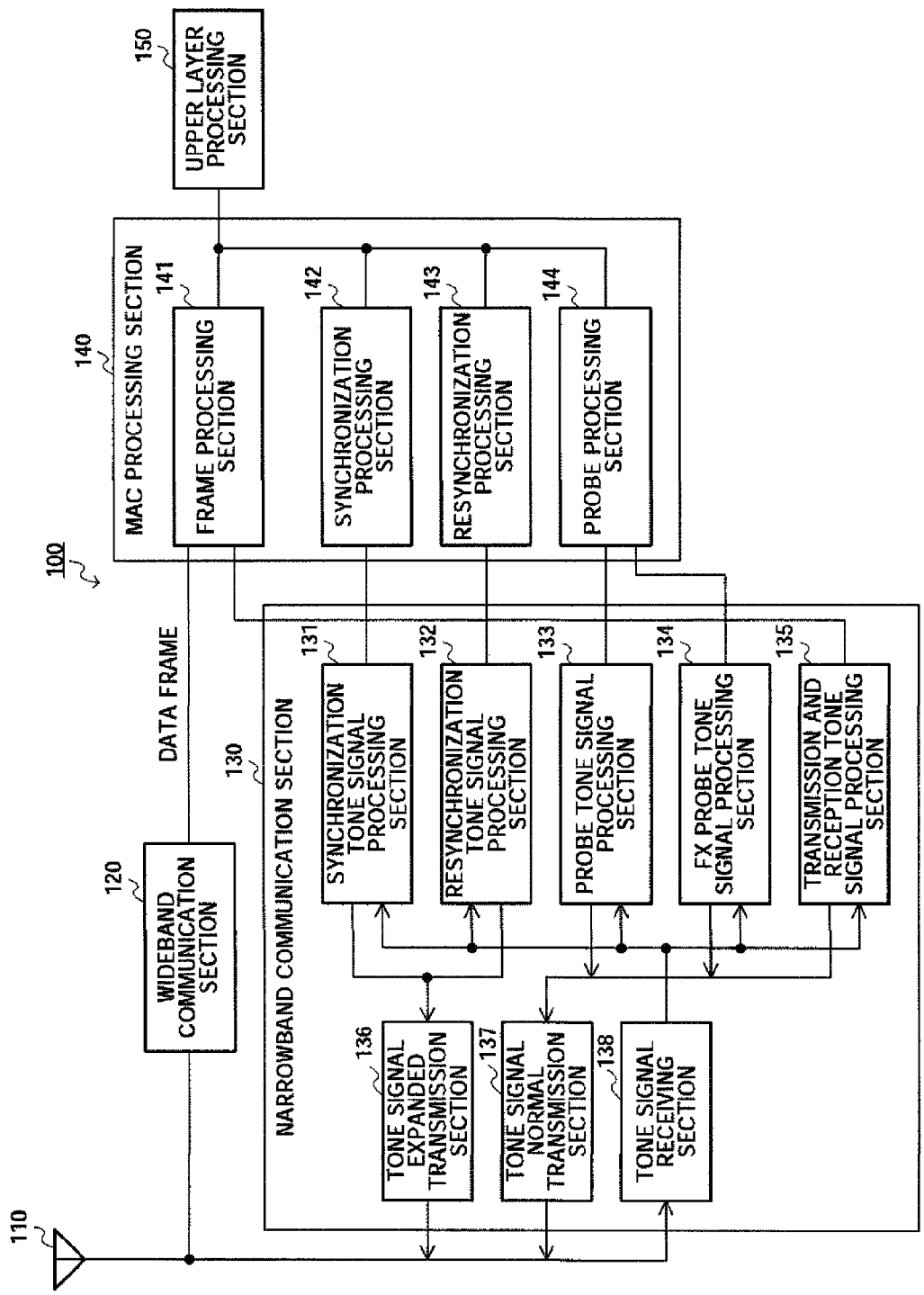
FIG. 3 is a block diagram showing a configuration of a wireless communication apparatus according to Embodiment 1 of the present invention.

FIG. 3 is a block diagram showing a configuration of the wireless communication apparatus according to Embodiment 1 of the present invention.

Wireless communication apparatus (i.e. terminal) 100 shown in FIG. 3 has a file swapping application, and, roughly speaking, has antenna 110, wideband communication section 120, narrowband communication section 130, MAC processing section 140 and upper layer processing section 150. Here, as equipment building in wireless communication apparatus 100, for example, there are mobile terminals, notebook computers, mobile telephones, game machines and mobile players that have file swapping applications.

Antenna 110 is formed with, for example, a plurality of directional antennas covering each sector. The communication range is determined by controlling each directional antenna forming antenna 110 by a directivity controlling section (not shown).

Wideband communication section 120 transmits and receives millimeter wave UWB signals through antenna 110. As described above, the millimeter wave UWB signals refer to signals of very short transmission distances and very wide bands. Because of wideband characteristics, the millimeter wave UWB signals utilized in the present embodiment require a high-speed baseband signal processing circuit and consume substantial power.

Narrowband communication section 130 transmits and receives narrowband unmodulated tone signals through antenna 110. To detect unmodulated tone signals, only the received power of these signals needs to be detected and a high-speed baseband signal processing circuit is not required. Consequently, the narrowband communication section for detecting narrowband tone signals consumes little power. In this way, by using wideband communication and narrowband communication in combination in ad-hoc network, it is possible to reduce power consumption in the entire apparatus.

As shown in FIG. 3, narrowband communication section 130 has synchronization tone signal processing section 131, resynchronization tone signal processing section 132, probe tone signal processing section 133, FX probe tone signal processing section 134, transmission and reception tone signal processing section 135, tone signal expanded transmission section 136, tone signal normal transmission section 137 and tone signal receiving section 138.

Tone signal processing sections 131 to 135 of narrowband communication section 130 carryout processing of generating applicable transmitting tone signals according to commands received from MAC processing section 140 and recognizing whether or not received tone signals are tone signals for respective tone signal processing sections 131 to 135. To be more specific, synchronization tone signal processing section 131 carries out processing of generating or recognizing a synchronization tone signal. Resynchronization tone signal processing section 132 carries out processing of generating or recognizing a resynchronization tone signal. Probe tone signal processing section 133 carries out processing of generating or recognizing a probe tone signal. FX probe tone signal processing section 134 carries out processing of generating or recognizing an FX probe tone signal. Transmission and reception tone signal processing section 135 carries out processing of generating or recognizing a transmission and reception tone signal.

With the present embodiment, the synchronization tone signal generated by synchronization tone signal processing section 131 and the resynchronization tone signal generated by resynchronization tone signal processing section 132 are transmitted to the outside through tone signal expanded transmission section 136 and antenna 110. The probe tone signal generated by probe tone signal processing section 133, the FX probe tone signal generated by FX probe tone signal processing section 134 and the transmission and reception tone signal generated by transmission and reception tone signal processing section 135 are outputted to the outside through tone signal normal transmission section 137 and antenna 110. Various tone signals received from the outside through antenna 110 and tone signal receiving section 138 are outputted to synchronization tone signal processing section 131, resynchronization tone signal processing section 132, probe tone signal processing section 133, FX probe tone signal processing section 134 and transmission and reception tone signal processing section 135 and recognized by applicable processing sections 131 to 135.

Here, the various tone signals will be described.

With the present embodiment, as described above, the synchronization tone signal, resynchronization tone signal, probe tone signal, FX probe tone signal and transmission and reception tone signal are used as tone signals. The "synchronization tone signal" refers to a tone signal transmitted for synchronization control in a group sharing the superframe. The "resynchronization tone signal" refers to a tone signal transmitted for resynchronization between superframe groups. The "probe tone signal" refers to a tone signal used to search for neighboring terminals. The "FX probe tone signal" refers to a tone signal used to search for terminals to swap files with. Particularly, the probe tone signal refers to a signal for requesting all terminals, including surrounding terminals of sleep mode, to transmit profiles from all terminals in the superframe of applicable lap or in the next superframe at a random time. Further, the FX probe tone signal refers to a signal targeting only terminals to swap files with, instead of all terminals to which the probe tone signal is transmitted. The "transmission and reception tone signal" refers to a tone signal transmitted to report that data communication is carried out.

Further, the method of producing these tone signals is not particularly limited. For example, various tone signals may be produced by changing the frequency of the narrowband signal and may be identified according to the frequency at the receiving side or may be produced by changing the duration of the tone signal. Further, it is possible to provide the same advantage by, instead of unmodulated tone signals, using the synchronization tone signal, FX probe tone signal, probe tone signal and resynchronization tone signal of modulated signals of narrower bands than signals used in data communication. In this case, for example, OOK-modulated binary signals or modulated signals spread using different codes can be used as modulated signals. Furthermore, various tone signals may be produced by temporal fluctuation of electric field intensity and intermittent signal patterns.

A case will be described here as an example where various tone signals are produced by the durations of tone signals and intermittent patterns.

Figure 4:
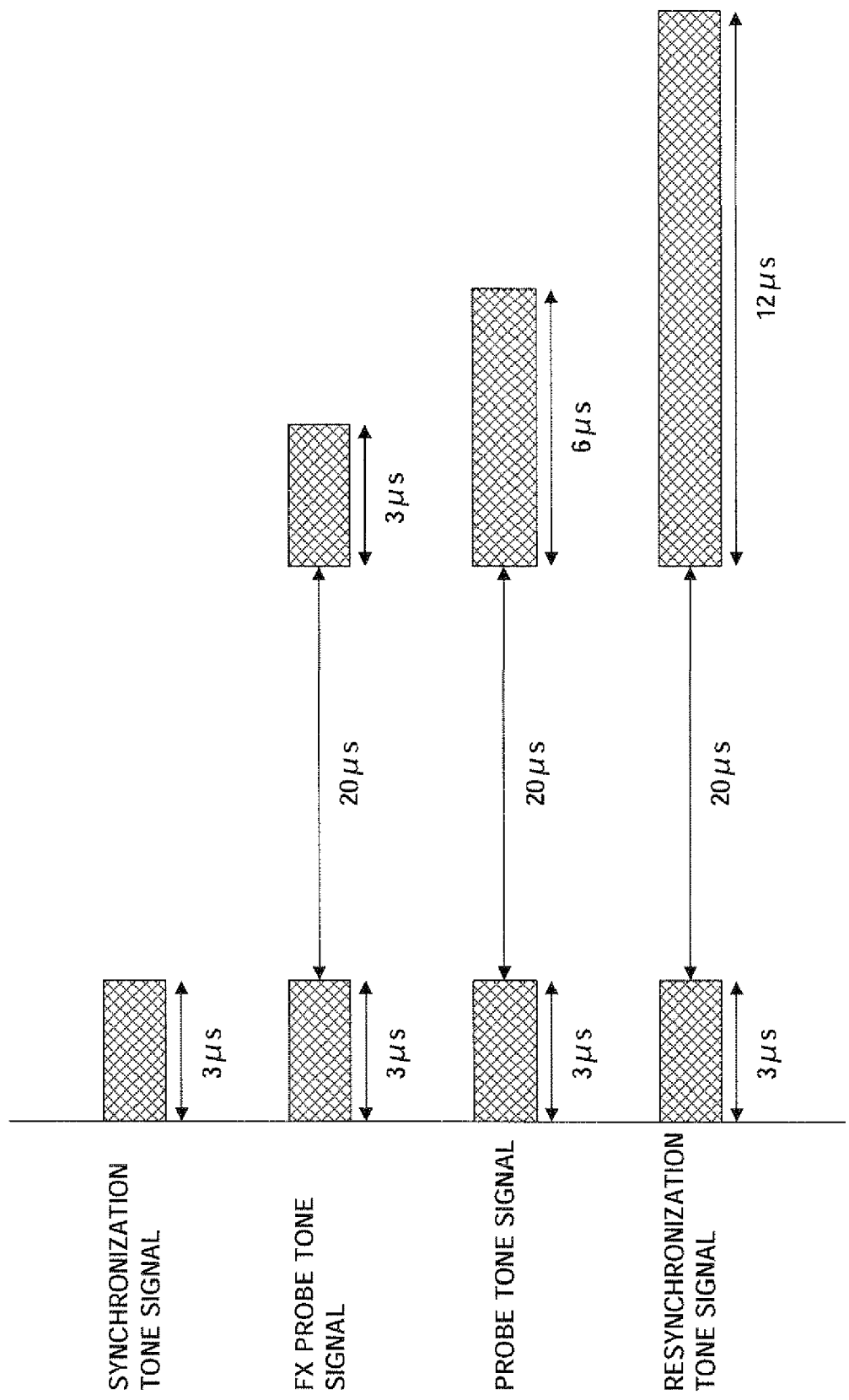
FIG. 4 shows an example of configurations of various tone signals according to Embodiment 1.

FIG. 4 shows an example of configurations of various tone signals.

In FIG. 4, the synchronization tone signal is formed only with one tone having a predetermined duration (for example, three micro seconds) and is transmitted at the time a superframe period starts. All terminals transmit the synchronization tone signal, so that, at the superframe transmitting timing of the terminal to transmit the synchronization tone signal first, terminals in the same superframe group are synchronized. Further, the resynchronization tone signal, probe tone signal and FX probe tone signal are configured to be transmitted subsequent to the synchronization tone signal, and the functions of the resynchronization tone signal, probe tone signal and FX probe tone signal are produced in combination with the synchronization tone signal. To be more specific, the FX probe tone signal is formed with two tones having predetermined durations (for example, three micro seconds and three micro seconds) placing a predetermined time interval (for example, twenty micro seconds) in between. The probe tone signal is formed with two tones having predetermined durations (for example, three micro seconds and six micro seconds) placing the above predetermined time interval (twenty micro seconds) in between. The resynchronization tone signal is formed with two tones having predetermined durations (for example, three micro seconds and twelve micro seconds) placing the above predetermined time interval (twenty micro seconds) in between. With this example, the duration (six micro seconds) of the second tone forming the probe tone signal is twice the duration (three micro seconds) of the second tone forming the FX probe tone signal. Further, the duration (twelve micro seconds) of the second tone forming the resynchronization tone signal is twice the duration (six micro seconds) of the second tone forming the probe tone signal. According to such a configuration, transmission of the resynchronization tone signal, probe tone signal and FX probe tone signal is allowed as long as the synchronization tone signal is transmitted in the synchronization tone slot provided in the boundary between superframes.

Further, although not shown, the transmission and reception tone signal is formed with one tone having, for example, a duration of one micro second.

In this way, according to the configurations of various tone signals shown in FIG. 4, the resynchronization tone signal, probe tone signal and FX probe tone signal are generally identified based on the length of the tone transmitted after the synchronization tone signal. That is, as long as the length of the tone is set longer for processing that must be preferentially carried out when various tone signals are transmitted at the same time, if tones overlap each other, surrounding terminals receiving the tone signals are able to execute processing that must be preferentially carried out by recognizing the tone signals of higher priority (that is, longer tones). To be more specific, when the resynchronization tone signal and FX probe tone signal are transmitted at the same time, the surrounding terminals judge that the resynchronization tone signal is transmitted, and execute resynchronization processing. Further, given that terminals that must respond to the FX probe tone signal return responses to the probe tone signal, the priority of the probe tone signal is set higher than the priority of the FX probe tone signal. Further, given that the surrounding terminals are able to execute probe processing only in a condition where the superframe does not change, the priority of the resynchronization tone signal is set higher than the priority of the probe tone signal.

For example, if various tone signals have the configurations shown in FIG. 4, when receiving a tone of three micro seconds, synchronization tone signal processing section 131 judges (recognizes) that the synchronization tone signal is received. Further, when receiving a tone of three micro seconds and then receiving a tone equal to or more than three micro seconds and less than six micro seconds after an interval of twenty micro seconds, FX probe tone signal processing section 134 judges (recognizes) that the FX probe tone signal is received. Furthermore, when receiving a tone of three micro seconds and then receiving a tone equal to or more than six micro seconds and less than twelve micro seconds after an interval of twenty micro seconds, probe tone signal processing section 133 judges (recognizes) that the probe tone signal is received. Still further, when receiving a tone of three micro seconds and then receiving a tone equal to or more than twelve micro seconds after an interval of twenty micro seconds, resynchronization tone signal processing section 132 judges (recognizes) that the resynchronization tone signal is received. When receiving a tone of one micro second without the synchronization tone signal, transmission and reception tone signal processing section 135 judges (recognizes) that the transmission and reception tone signal is received.

Tone signal expanded transmission section 136 carries out transmission processing (hereinafter "expanded transmission processing") such that an inputted tone signal has a greater signal reachable range than the tone signal subjected to transmission processing in tone signal normal transmission section 137. With the present embodiment, tone signal expanded transmission section 136 carries out this expanded transmission processing with respect to the synchronization tone signal and resynchronization tone signal. The expanded transmission processing is realized by, for example, adjusting transmission power. To be more specific, the expanded transmission processing is realized by, for example, carrying out transmission by increasing transmission power compared to the case of wideband communication or the case where the probe tone signal or the FX probe tone signal is transmitted.

Tone signal normal transmission section 137 carries out normal transmission processing (hereinafter "normal transmission processing") with respect to an inputted tone signal. With the present embodiment, tone signal normal transmission section 137 carries out this normal transmission processing with respect to the probe tone signal and FX prove tone signal. Transmission power in the normal transmission processing is less than expanded transmission processing. At this point, the reachable ranges of these two tone signals are adjusted to be the same as the reachable range of a wideband signal (i.e. millimeter wave UWB signal) that enables file swapping. Further, tone signal normal transmission section 137 carries out this normal transmission processing with respect to the transmission and reception tone signal.

In this way, with the present embodiment, given that the reachable ranges of the synchronization tone signal and resynchronization tone signal of a narrow band are set greater than the reachable range of a wideband signal (i.e. millimeter wave UWB signal), when terminals pass each other, superframe synchronization is finished before terminals reach the possible range of wideband communication in ad-hoc network, so that it is possible to utilize the possible time of wideband communication at maximum.

Figure 1:
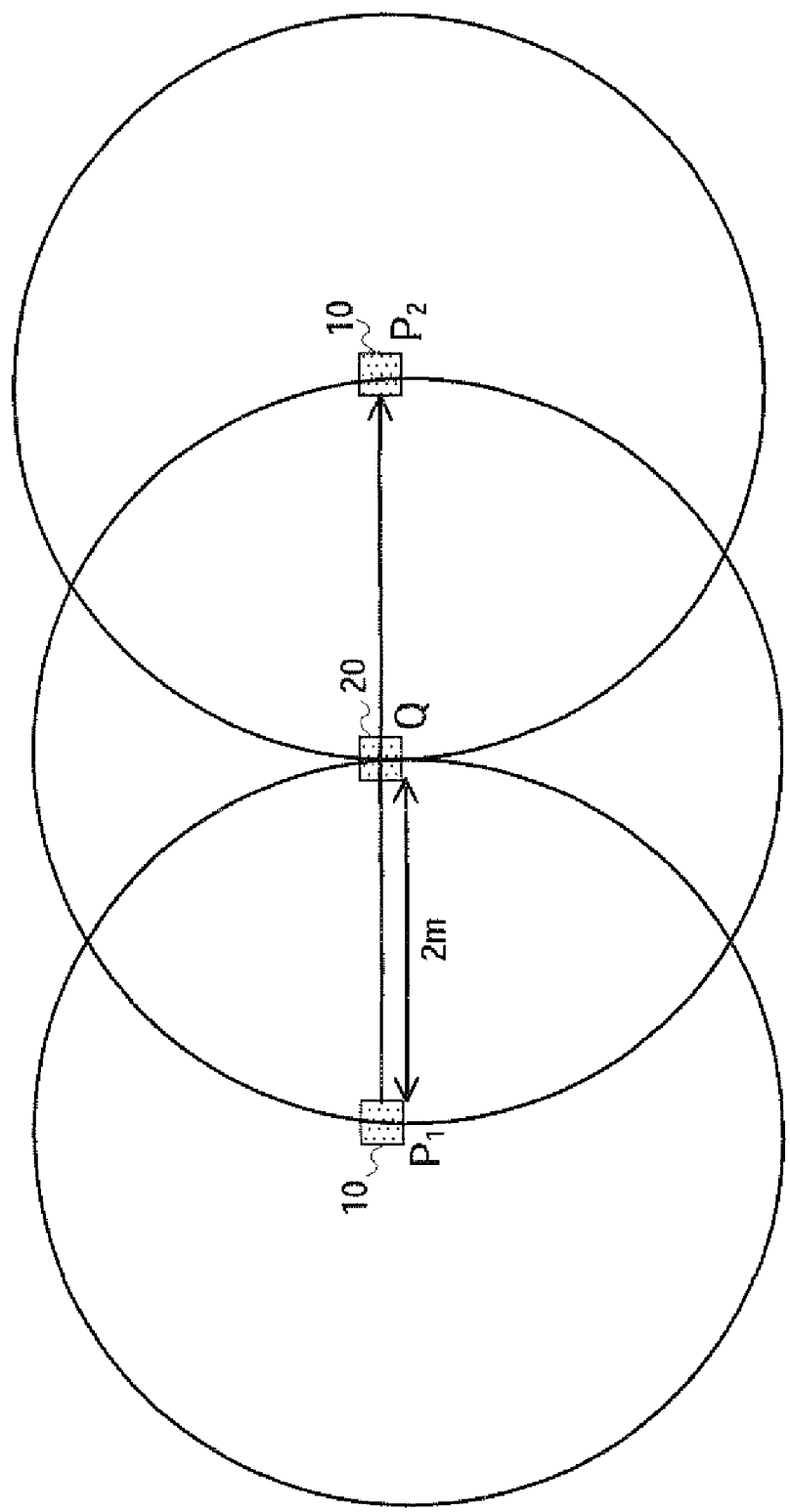
FIG. 1 shows an optimum state of passing according to a conventional tone signal synchronization scheme.
Figure 2:
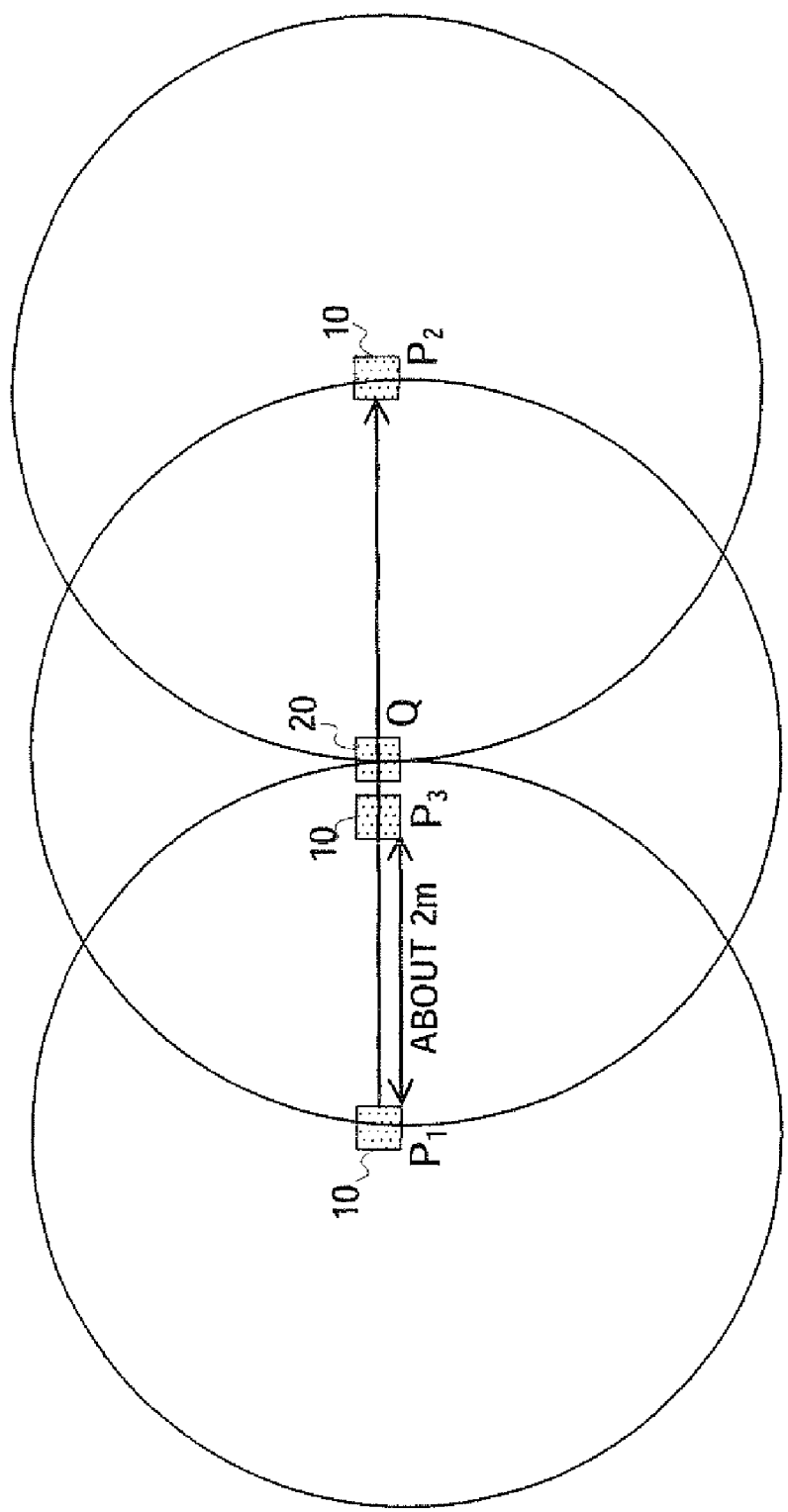
FIG. 2 shows the worst state of passing according to the conventional tone signal synchronization scheme.
Figure 5:
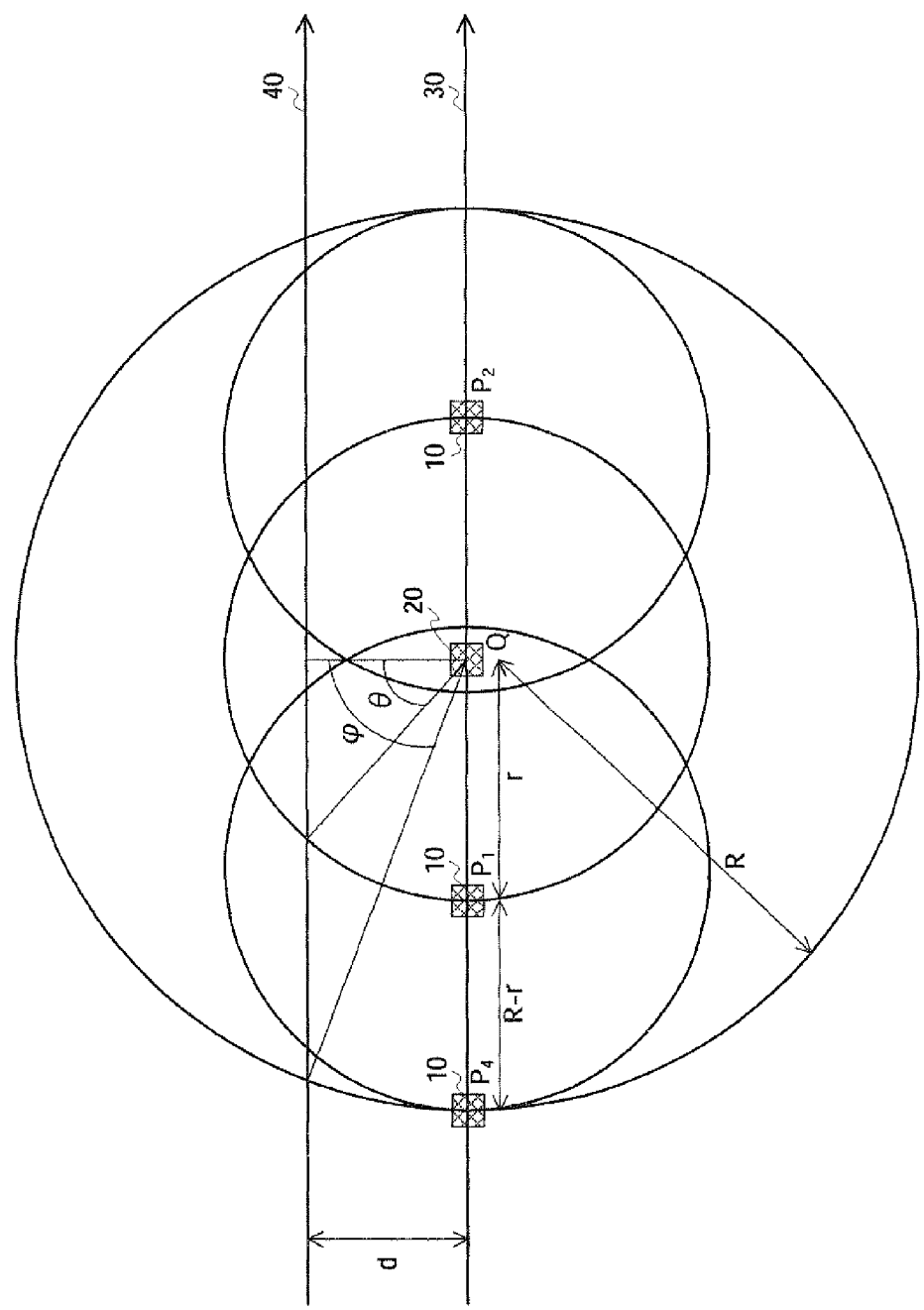
FIG. 5 illustrates the principle of the present invention.

This principle will be described using FIG. 5. For ease of comparison between FIG. 1 and FIG. 2, the same elements will be assigned the same reference numerals.

First, a case will be described where two terminals 10 and 20 pass at the minimum passing distance 0 meter (see moving trajectory 30 of terminal 10 in FIG. 5).

Here, for example, the superframe period is "T," the resynchronized superframe lap count is "N," the estimated moving speed is "V," and the reachable radii of the probe tone signal and FX probe tone signal are "r," the reachable radii of the synchronization tone signal and resynchronization tone signal are "R" (R>r), and R=r+vNT. In this case, terminal 10 takes NT seconds to reach point $P_1$ from point $P_4$, across a distance of vNT (=R−r) and, therefore, resynchronization starts during NT seconds (that is, "vNT" represents the possible distance of resynchronization), so that synchronization is acquired when terminal 10 reaches point $P_1$. Consequently, by transmitting the FX probe tone signal and the synchronization tone signal in combination from this time point, it is possible to transmit and receive full data in point $P_1$ to which the wideband signal (i.e. millimeter wave UWB signal) is able to reach. Further, when r=2 m, v=2 m/s, N=16 times and T=0.064 s hold, R≈4 m holds from the above equation.

Next, a case will be described where two terminals 10 and 20 pass each other at the minimum passing distance d(d>0) (see moving trajectory 40 of terminal 10 in FIG. 5).

In this case, the following two equations of equation 1 and equation 2 hold, $$d = r\cos\theta = R\cos\phi \quad \text{(Equation 1)}$$

$$R\sin\phi = vNT + r\sin\theta = vNT + \sqrt{(r^2 - d^2)} \quad \text{(Equation 2)}$$

so that following equation 3 holds.

$$R = \sqrt{((vNT + \sqrt{(r^2 - d^2)})^2 + d^2)} \quad \text{(Equation 3)}$$

Here, when d=1 m, r=2 m, v=2 m/s, N=16 times and T=0.064 s, R is about 3.9 meters.

Further, by, for example, differentiating $R^2$ by d according to above equation 3, following equation 4 holds.

$$dR^2/dd = -2vNTd/\sqrt{(r^2-d^2)} \quad \text{(Equation 4)}$$

According to this equation 4, R adopts a maximum value when d=0. When d=0, R=r+vNT. Accordingly, the maximum value of R is R=r+vNT when d=0. Consequently, as to the minimum passing distance, other passing distances can be covered by taking into account the case of d=0.

Upper layer processing section 150 executes various applications and carries out application processing by generating and outputting transmission data such as content data to MAC processing section 140 and receiving received data from MAC processing section 140. With the present embodiment, the file swapping application is executed by upper layer processing section 150.

MAC processing section 140 carries out MAC protocol processing. MAC processing section 140 has, for example, frame processing section 141, synchronization processing section 142, resynchronization processing section 143 and probe processing section 144.

Frame processing section 141 carries out processing of transmitting and receiving tones (i.e. transmission and reception tone signals) for reporting that data communication is carried out and processing of transmitting and receiving a subsequent data frame using a wideband signal (i.e. millimeter wave UWB signal). The data frame is transmitted to and received from the outside through wideband communication section 120 and antenna 110. The transmission and reception tone signal is transmitted to and received from the outside as described above through narrowband communication section 130 (transmission and reception tone signal processing section 135, tone signal normal transmission section 137 and tone signal receiving section 138) and antenna 110.

Synchronization processing section 142 manages the time from the time the superframe starts, measures the transmission time of the synchronization tone signal for reporting the end of the superframe of wireless communication apparatus 100 and exchanging a timing with synchronization tone signal processing section 131 in narrowband tone signal 130 for acquiring synchronization with the synchronization tone signal of other node.

Resynchronization processing section 143 carries out processing of transmitting the resynchronization tone signal from resynchronization tone signal processing section 132 in narrowband communication section 130 to synchronize with another superframe group. Further, resynchronization processing section 143 monitors synchronization tone signals in the entire superframe and reports the synchronization timing with another superframe, to synchronization processing section 142.

Probe processing section 144 receives prove requests (probe tone signal and FX prove tone signal) from other terminal, and reports the probe requests to upper layer processing section 150. By this means, upper layer processing section 150 carries out processing of generating information (i.e. data frame) such as attributes and communication environment of wireless communication apparatus 100 and answering the terminal of the request source through frame processing section 141 and wideband communication section 120. Further, probe processing section 144 carries out processing for transmitting probe requests (probe tone signal and FX probe tone signal) for requesting information such as attributes and communication environment of the surrounding terminals, through probe tone signal processing section 133 and FX probe tone signal processing section 134 of narrowband communication section 130, to the surrounding terminals.

To be more specific, commands from the upper layer are required to emit a probe tone signal. Emitting the probe tone signal is carried out by transmitting the synchronization tone signal (three micro seconds) and then transmitting a tone signal (six micro seconds) after twenty micro seconds pass (see FIG. 4). At this time, when receiving the probe tone signal, the reaction of the surrounding terminals is to transmit probe responses in the applicable superframe or in the next superframe.

Further, when resynchronization with another superframe takes place by receiving the resynchronization tone signal, the FX probe tone signal is Emitted following this resynchronization. Emitting the FX probe tone signal is carried out by transmitting the synchronization tone signal (three micro seconds) and then transmitting the tone signal (micro seconds) after twenty micro seconds pass. At this time, the reaction of the surrounding terminals is to transmit probe responses in the applicable superframe or in the next superframe only if the FX probe tone signal is received and the upper layer has the file swapping application.

Further, the number of times to repeat transmitting the FX probe tone signal is set, for example, as follows. The FX probe tone signal is transmitted for, for example, 2 r/v seconds continuously at maximum. The terminal that has transmitted the FX probe tone signal proceeds to the swapping step only with file swapping terminals newly found during transmission. Further, file swapping terminals that do not come across suddenly and that are moving in combination need not respond to the FX probe tone signal transmitted continuously except in the first time and only need to respond once in n times. That is, the probe tone signal is not transmitted upon passing and therefore is generally premised to be finished in one transmission. To search for other party to swap files with, the FX probe tone signal continues being transmitted utilizing the present scheme until the terminal reaches the range to swap files with and, if there is no response after transmitting the FX probe tone signal for 2 r/v seconds continuously, transmission is finished. However, if other party is found and a file has been swapped once with the other party, for example, if friends carrying terminals that can swap files are walking together, when a third party carrying a terminal that supports file swapping comes closer, answering all FX probe tone signals received continuously during 2 R/v seconds is useless for the friends' terminals, so that the friends' terminals only need to answer at a first time and then make responses sometimes thereafter.

Here, various tone signals and frames will be described.

Figure 6:
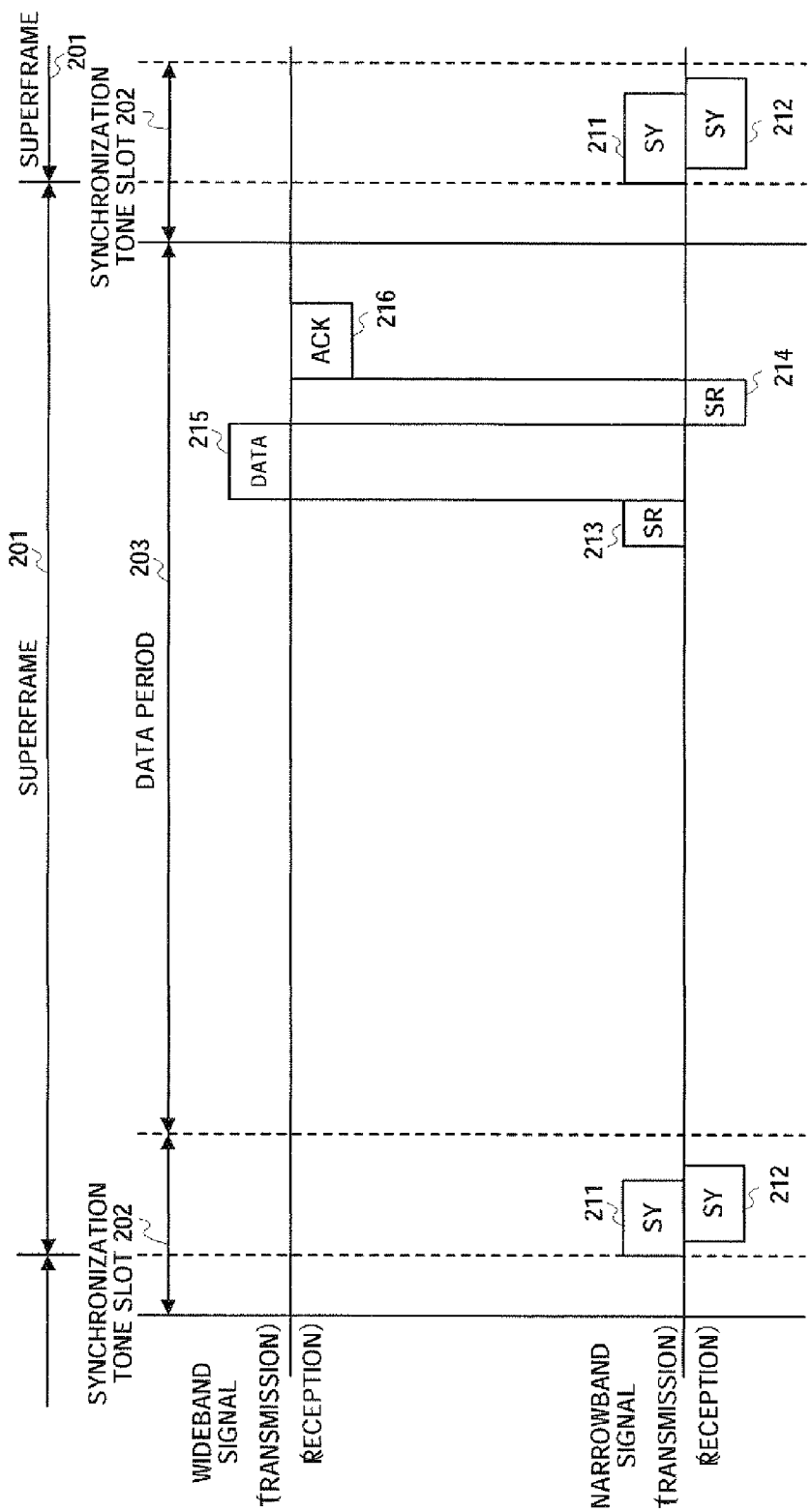
FIG. 6 is a timing chart showing a protocol for transmitting and receiving various signals and frames according to Embodiment 1.

FIG. 6 is a timing chart showing transmission and reception protocols for various tone signals and frames.

In FIG. 6, superframe 201 has synchronization tone slot 202 and data period 203. Synchronization tone slot 202 refers to a period in which synchronization tone signals (SY) 211 and 212 are transmitted and received. As shown in FIG. 6, transmission and reception tones (SR) 213 and 214, data 215 and ACK/NACK 216 are transmitted and received in data period 203, which is a period apart from synchronization tone slot 202 in superframe 201.

Next, the operation of the wireless communication apparatus having the above configuration will be described.

First, superframe synchronization processing is will be described.

Figure 7:
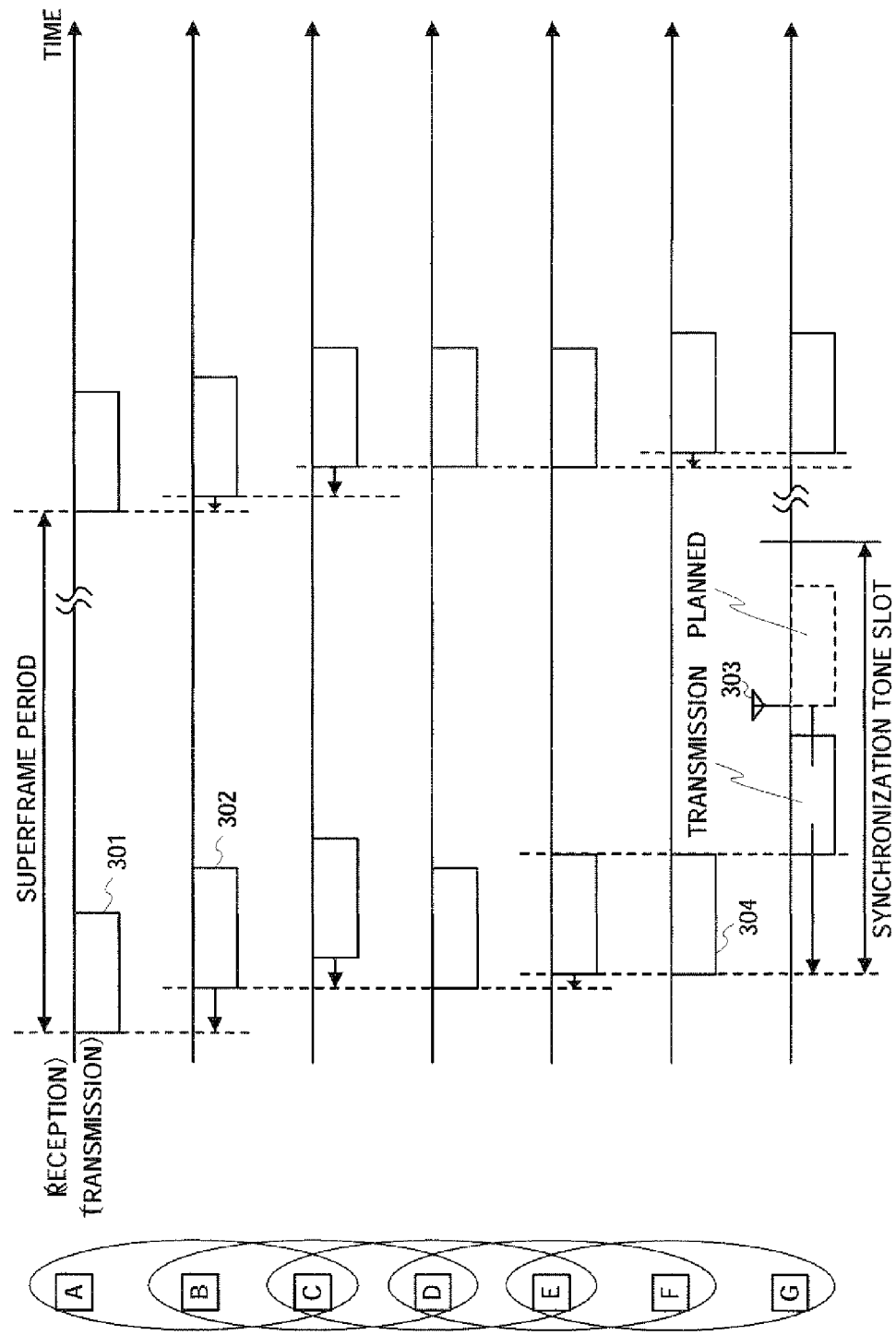
FIG. 7 shows an operation of synchronizing superframes according to Embodiment 1.

FIG. 7 shows the operation of each terminal in the same superframe group for synchronizing superframe periods. Here, the ellipses in FIG. 7 refer to possible ranges of communication for terminals and terminal A to terminal G are adjacent to each other as shown in FIG. 7. Further, the signal in the upper part for each terminal means reception and the signal in the lower part means transmission.

In FIG. 7, terminal B transmits synchronization tone signal 302 at a timing for outputting the synchronization tone signal in the superframe period. However, terminal B detects synchronization tone signal 301 of terminal A prior to transmitting synchronization tone signal 302 of terminal B, so that terminal B adjusts the superframe period start timing measured by terminal B to superframe period start timing 301 of terminal A. Further, similarly, terminal C synchronizes the superframe start timing of terminal C with synchronization tone signal 302 of terminal B. In this way, the delay times of terminal B and terminal C are gradually converged to a unique delay time matching superframes of terminal B and terminal C.

Terminal D and terminal F carry out the same processing likewise, and synchronize with the superframe of a terminal that transmits the synchronization tone signal at the earliest time in the possible ranges of communication of terminal D and terminal F.

Synchronization tone signal transmission time 303 of terminal G comes after terminal F transmits synchronization tone signal 304, and so terminal G transmits the synchronization tone signal at the time terminal F finishes transmitting synchronization tone signal 304. Then, in the next superframe, terminal G catches up with the superframe start timing of other terminal.

Next, superframe resynchronization processing carried out when there are a superframe group and another superframe group, will be described.

The superframe resynchronization processing means processing of detecting the synchronization tone signal in the entire superframe and, when the synchronization tone signal of another superframe group is detected, acquiring synchronization with the superframe of another superframe group that has transmitted the synchronization tone signal at the earliest time.

Figure 8:
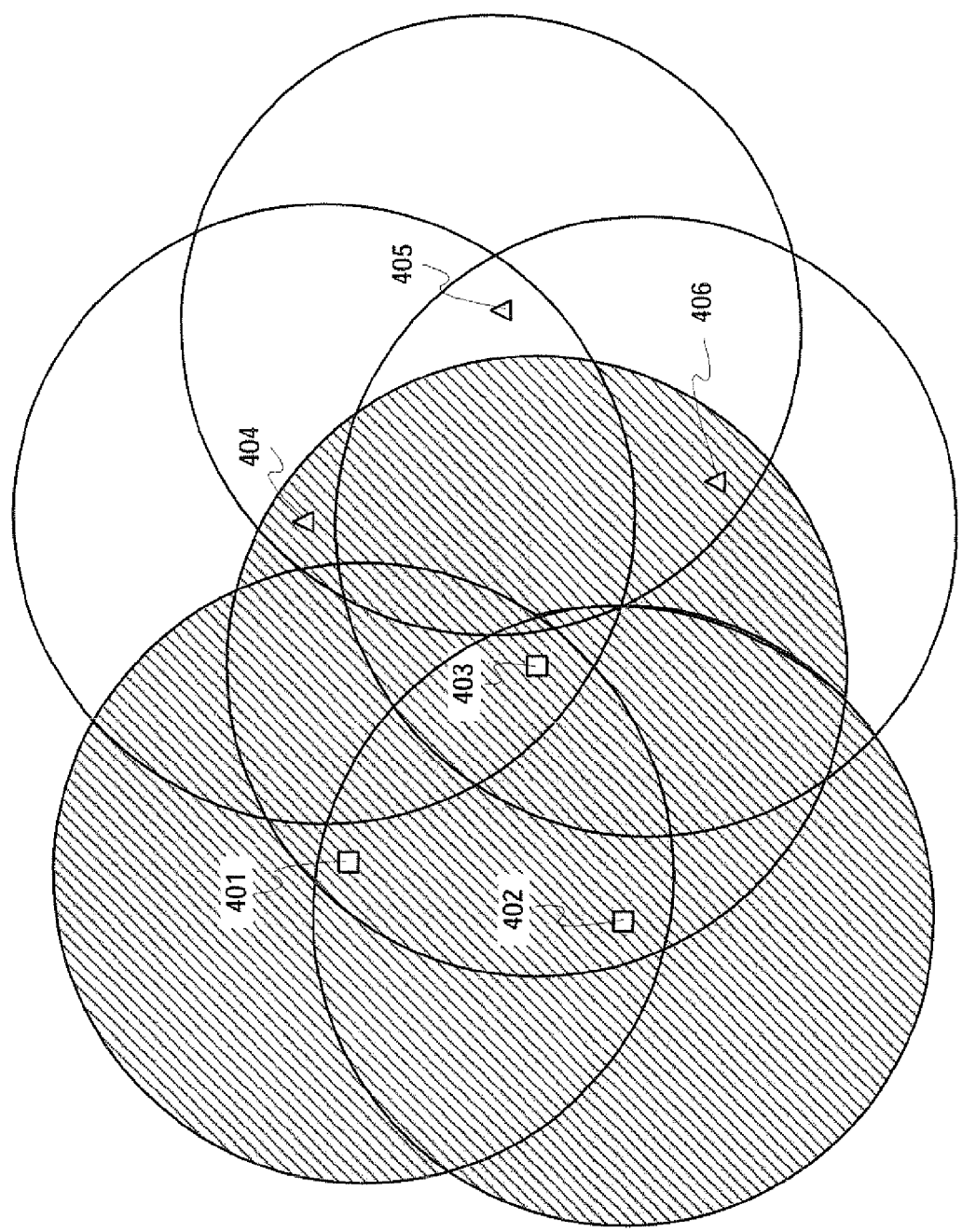
FIG. 8 shows arrangement of two superframe groups according to Embodiment 1.

FIG. 8 shows that terminals 401 to 403 form a superframe group and terminals 404 to 406 form another superframe group. In FIG. 8, terminal 404 and terminal 406 come into the possible range of communication of terminal 403.

In this case, when terminal 403 detects the synchronization tone signal of another superframe group outside the synchronization tone signal slot, this triggers terminals in the same superframe group as terminal 403 to carry out resynchronization processing and finally terminals 401 to 406 to share the same superframe.

Figure 9:
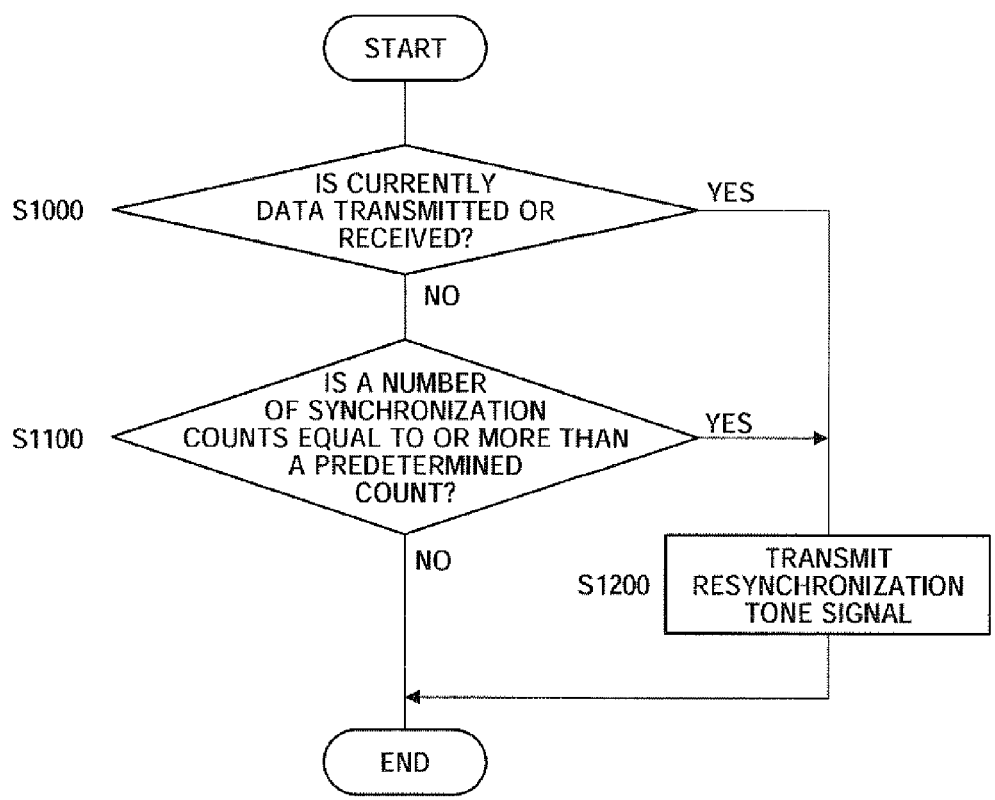
FIG. 9 is a flowchart illustrating processing of resynchronizing superframes according to Embodiment 1.

FIG. 9 is a flowchart illustrating superframe resynchronization processing.

In FIG. 9, first, resynchronization processing section 143 judges whether or not the wireless communication apparatus is currently transmitting and receiving data to and from other terminal (S1000). If the terminal is not currently transmitting and receiving data to and from other terminal as a result of this decision (S1000: NO), resynchronization processing section 143 judges whether or not the synchronization count is equal to or greater than a predetermined count (for example, N times). To be more specific, resynchronization processing section 143 judges whether or not the terminal runs in a predetermined resynchronized superframe lap count (N times) after previous resynchronization processing is finished and the terminal determines to carry out resynchronization (S1100). If the resynchronized superframe lap count increases, the count for placing the entire superframe in reception waiting mode decreases. Therefore, although power consumption is reduced, the start of communication with another group is delayed. Generally, for example, the resynchronized superframe lap count is adequately around one per second. If the synchronization count is equal to or greater than a predetermined count (N times) as a result of this decision (S1100: YES), resynchronization processing section 143 transmits the resynchronization tone signal regardless of other terminal (S1200). The resynchronization tone signal refers to, as described above (see FIG. 4), a tone signal for retransmitting a tone of twelve micro seconds at a time point of twenty micro seconds after transmission of the synchronization tone signal of the superframe group of this resynchronization tone signal, and for reporting to other terminal that resynchronization processing starts. Terminals that have received the resynchronization tone signal yet have not counted the resynchronized superframe laps, reset the superframe count, relay the resynchronization tone signal and enter resynchronization mode.

On the other hand, if a terminal is currently transmitting to and receiving data from other terminal as a result of judgment in step S1000 (S1000:YES), even if resynchronization count has not reached a predetermined count (N times) in the superframe group of the terminal, resynchronization processing section 143 transmits the resynchronization tone signal (S1200). By this means, it is possible to carry out resynchronization with another superframe group at high-speed.

Figure 10:
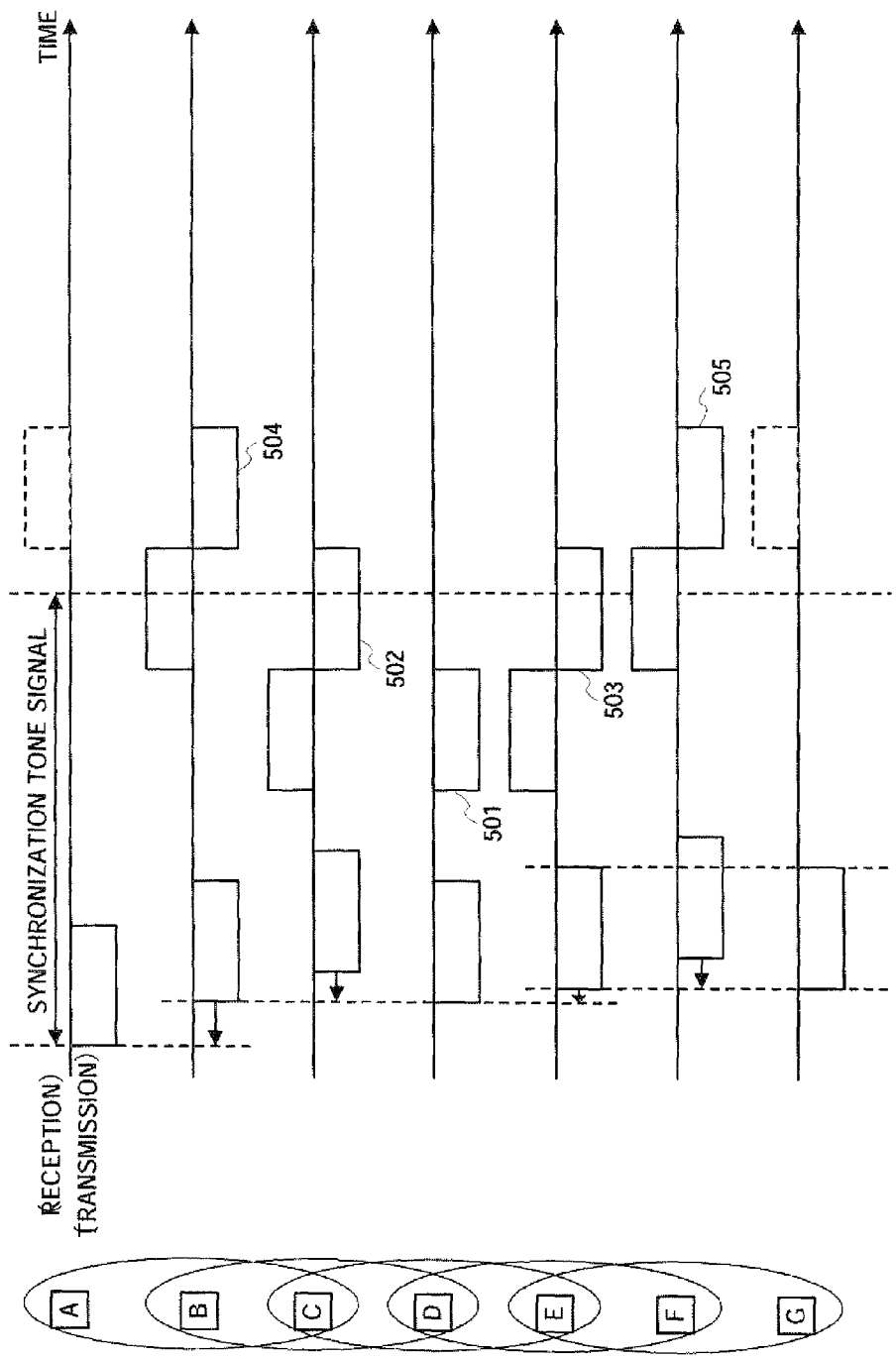
FIG. 10 shows operations of transmitting and receiving resynchronization tone signals according to Embodiment 1.

FIG. 10 shows the operation of transmitting and receiving the resynchronization tone signal by the terminal that detects another superframe group. Similar to the case of FIG. 7, terminal A to terminal G are adjacent as shown in FIG. 10. Further, in FIG. 10, the upper part of the signal of each terminal means reception and the lower part of the signal means transmission.

Here, terminal D detects the presence of another superframe group and transmits resynchronization tone signal 501. Terminal C and terminal E in surrounding superframe groups relay resynchronization tone signal 501 received from terminal D using resynchronization tone signals 502 and 503. However, for terminal A and terminal G, the synchronization tone signal slots are finished before resynchronization tone signals 504 and 505 are relayed and passed, and therefore terminal A and terminal G do not enter resynchronized mode.

However, terminal A and terminal G transmit resynchronization tone signals in the next superframe to synchronize with the synchronization tone signal outputted from terminal B to terminal F in synchronization, so that synchronization timings are converged to one synchronization timing as a whole.

Next, the operation of transmitting and receiving data will be described.

First, after a data frame is generated by upper layer processing section 150, frame processing section 141 transmits a transmission and reception tone signal from transmission and reception tone signal processing section 135 in narrowband communication section 130. Frame processing section 141 transmits the data frame using a wideband signal through wideband communication section 120 after having transmitted the transmission and reception tone signal.

By this means, a terminal in data frame waiting mode needs to wait only for a narrowband signal at all times, and is able to wait with little power consumption compared to mode of waiting for a wideband signal at all times.

Figure 11:
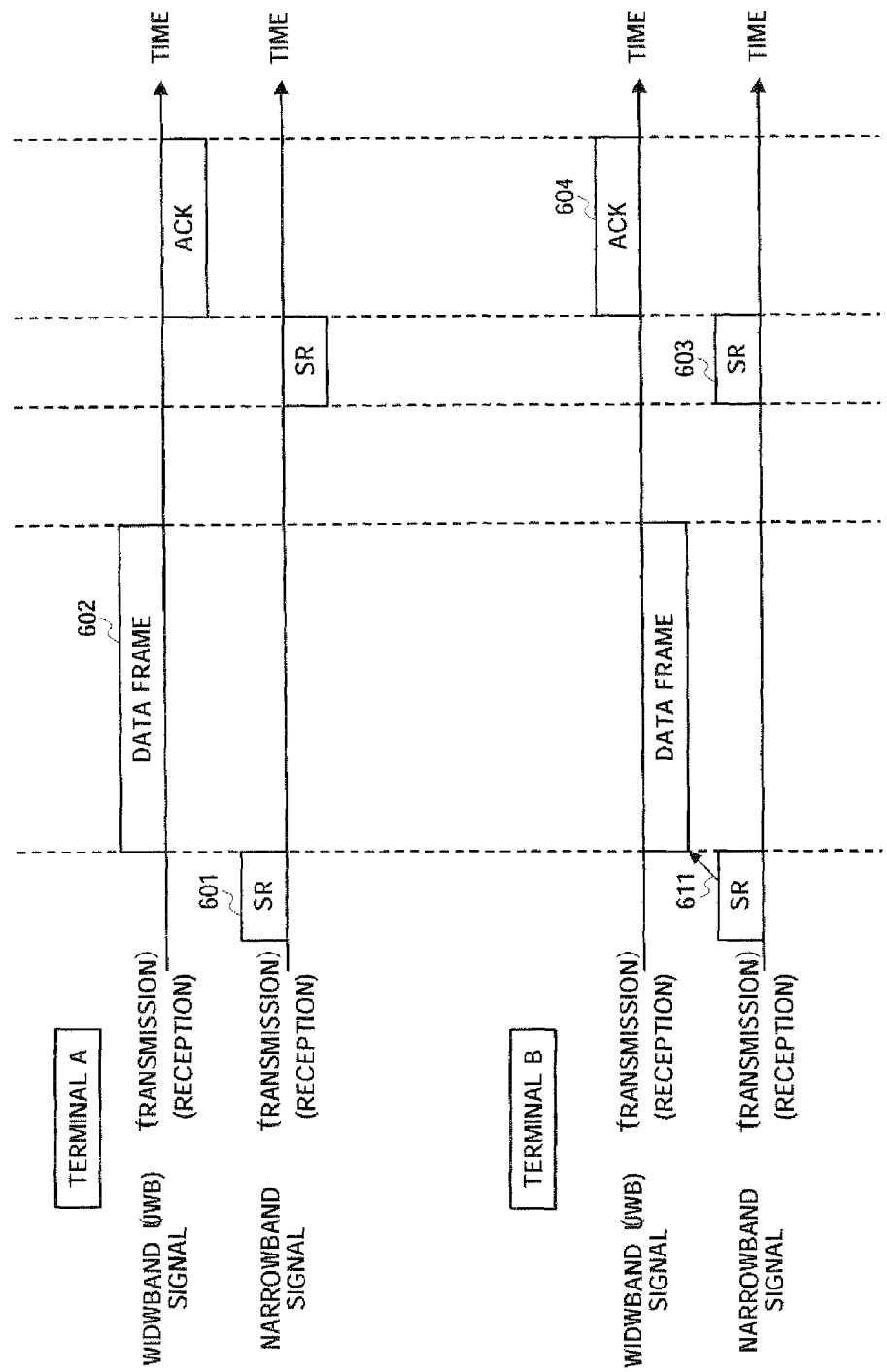
FIG. 11 shows data transmitting and receiving operations according to Embodiment 1.

FIG. 11 shows this operation of transmitting and receiving data.

In FIG. 11, terminal A transmits the data frame to terminal B and receives an acknowledge frame for the data frame (ACK). Each terminal enters reception waiting mode when each terminal is not transmitting a narrowband signal. Terminal A transmits transmission and reception tone single (SR) 601 before transmitting data frame 602 and terminal B receiving transmission and reception tone signal 601 enters reception waiting mode for wideband communication (arrow 611 in FIG. 11). Further, terminal B transmits ACK 604 after having transmitted transmission and reception tone signal (SR) 603. In this way, in any data frame, the transmission and reception tone signal is transmitted before the data frame is transmitted.

Next, probe processing for acquiring the communication states of surrounding terminals will be described.

To start communication, a terminal needs to know the presence and address of the communicating party. Further, it is necessary to check the presences of the surrounding terminals such that the transmission and reception signal does not collide with communication signals from other terminals. Consequently, with the present embodiment, attributes and communication environment of the surrounding terminals are acquired using the probe tone signal as described above.

When receiving the synchronization tone signal (three micro seconds) and then receiving a tone signal (equal to or more than six micro seconds and less than twelve micro seconds) after twenty micro seconds pass, the surrounding terminals judge that the probe tone signal is received, and transmit probe response frames including information of the surrounding terminals in the applicable superframe or in the next superframe, by broadcast. These transmission timings are set to carry out transmission by carrier sensing in random superframe offset positions so as not to collide with communication slots.

In this way, according to the present embodiment, given that reachable ranges (i.e. reachable radii) of the synchronization tone signal and resynchronization tone signal of a narrowband are set greater than the reachable range (i.e. reachable radius) of a wideband signal (i.e. millimeter UWB signal), when terminals pass each other, superframe synchronization is finished before terminals reach the possible range of wideband communication in ad-hoc network, so that it is possible to utilize the possible time of wideband communication at maximum.

Consequently, compared to the conventional tone signal synchronization scheme, it is possible to increase the amount of files to swap upon passing by, for example, the file swapping application. Further, wideband communication and narrowband communication are used in combination, so that it is possible to maintain the advantage of reducing power consumption.

Embodiment 2

A case will be described with Embodiment 2 where the tone signal synchronization scheme and a beacon period is combined. To be more specific, Embodiment 2 refers to a case where Embodiment 1 is realized and further the beacon period is implemented and a data communication time slot is assigned in the superframe using a beacon.

Figure 12:
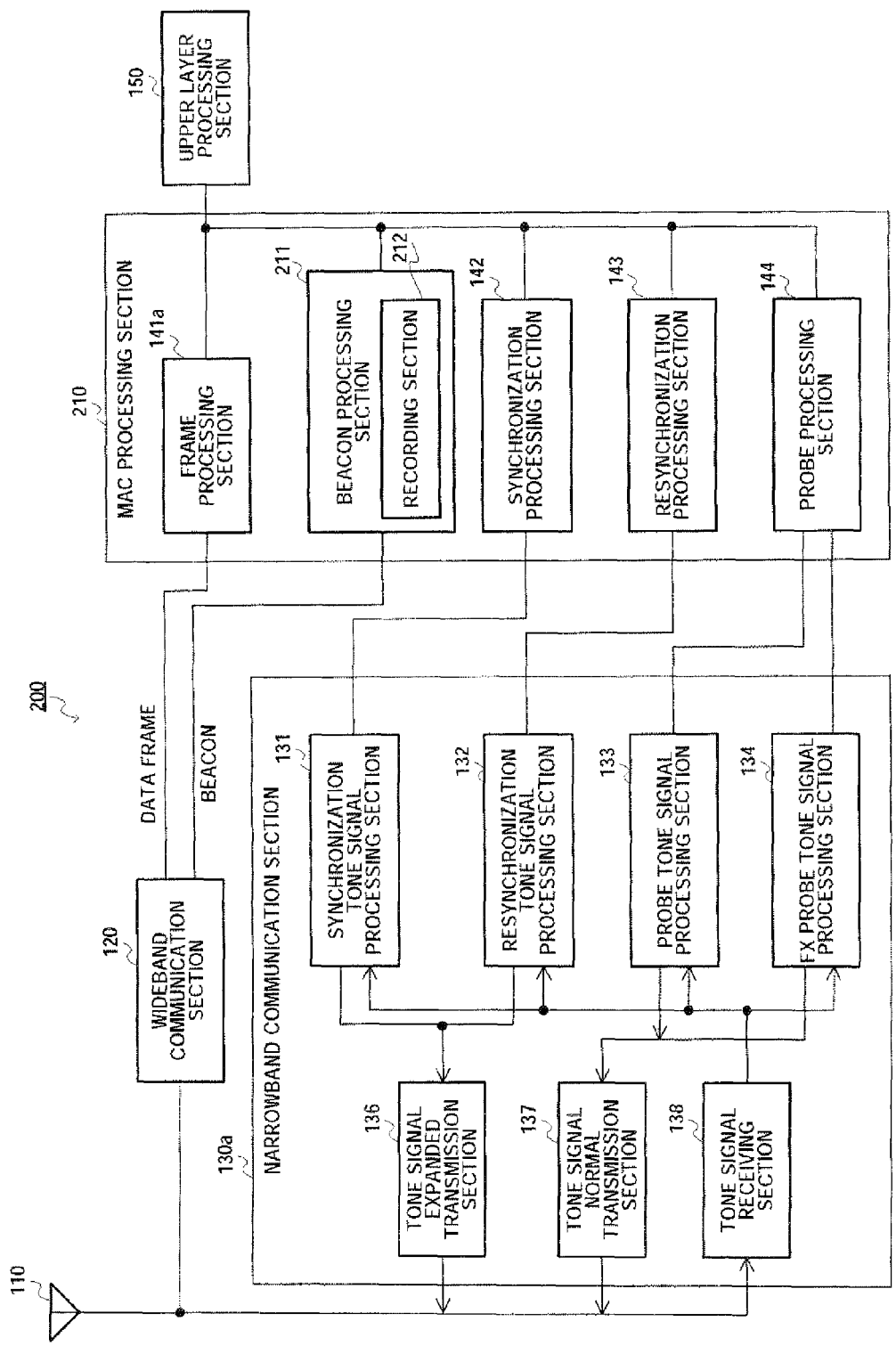
FIG. 12 is a block diagram showing a configuration of the wireless communication apparatus according to Embodiment 2 of the present invention.

FIG. 12 is a block diagram showing a configuration of the wireless communication apparatus according to Embodiment 2 of the present invention. Further, this wireless communication apparatus has the same basic configuration as the corresponding wireless communication apparatus in Embodiment 1 shown in FIG. 3, and the same components will be assigned the same reference numerals and description thereof will be omitted.

Wireless communication apparatus 200 shown in FIG. 12 has a function of combining the tone signal synchronization scheme and the beacon period as described above and assigning data communication time slots in a superframe using beacons. Consequently, wireless communication apparatus 200 has MAC processing section 210 and, particularly, beacon processing section 211. Although described later, beacon processing section 211 carries out various processings (for example, beacon period evacuation processing and beacon slot positioning processing) related to the beacon.

Further, although a transmission and reception tone signal in Embodiment 1 is not utilized with the present embodiment because the beacon is used for data communication, the present invention is not limited to this and the beacon and the transmission and reception tone may be simultaneously used (that is, can be used in combination). For example, transmitting a beacon by adding the transmission and reception tone signal is possible.

With the present embodiment, as described above, data communication time slots are assigned in a superframe using beacons. However, the beacon is not transmitted by all terminals but is transmitted by terminals in the middle of data communication or by terminals that have special reasons (that want to start data communication). Details including the data communication scheme are disclosed, for example, in Non-Patent document 1.

On the other hand, similar to Embodiment 1, the synchronization tone signals and resynchronization tone signals are transmitted from all terminals. The usages and reachable ranges of various tone signals including the probe tone signal and FX probe tone signal are the same as in Embodiment 1. However, the timing to start transmission to and reception from the address acknowledged by the response for the FX probe tone signal (that is, the timing to start file swapping) comes after transmission of a beacon.

Further, if the beacon is used, it is possible to replace the function of probe by transmitting and receiving the beacon, so that there is no problem with the file swapping application even if the probe tone signal and FX probe tone signal are not used.

The present embodiment prevents beacon collision in this environment when another beacon period group starts acquiring the same superframe synchronization.

Figure 13:
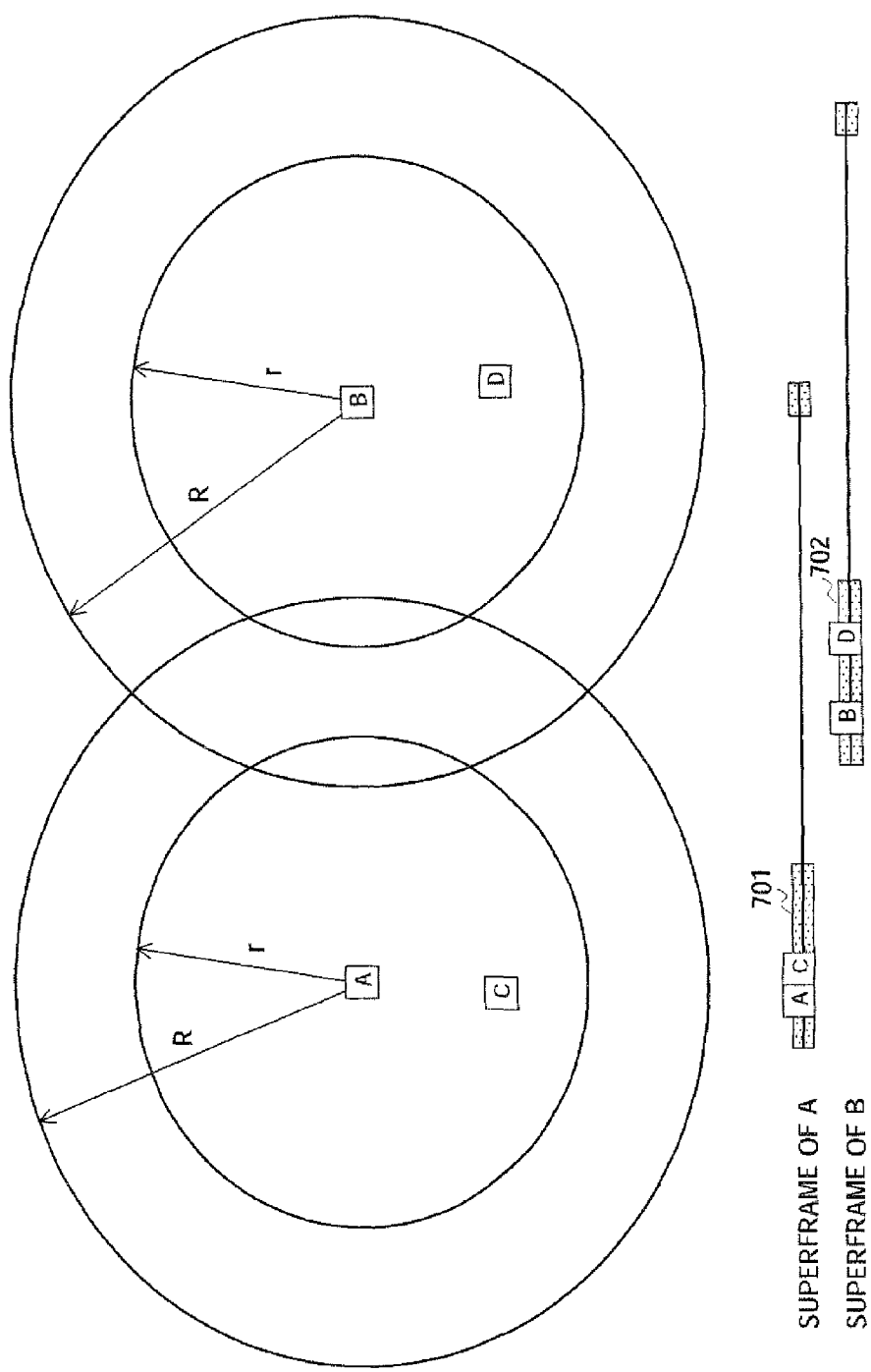
FIG. 13 illustrates beacon collision.
Figure 14:
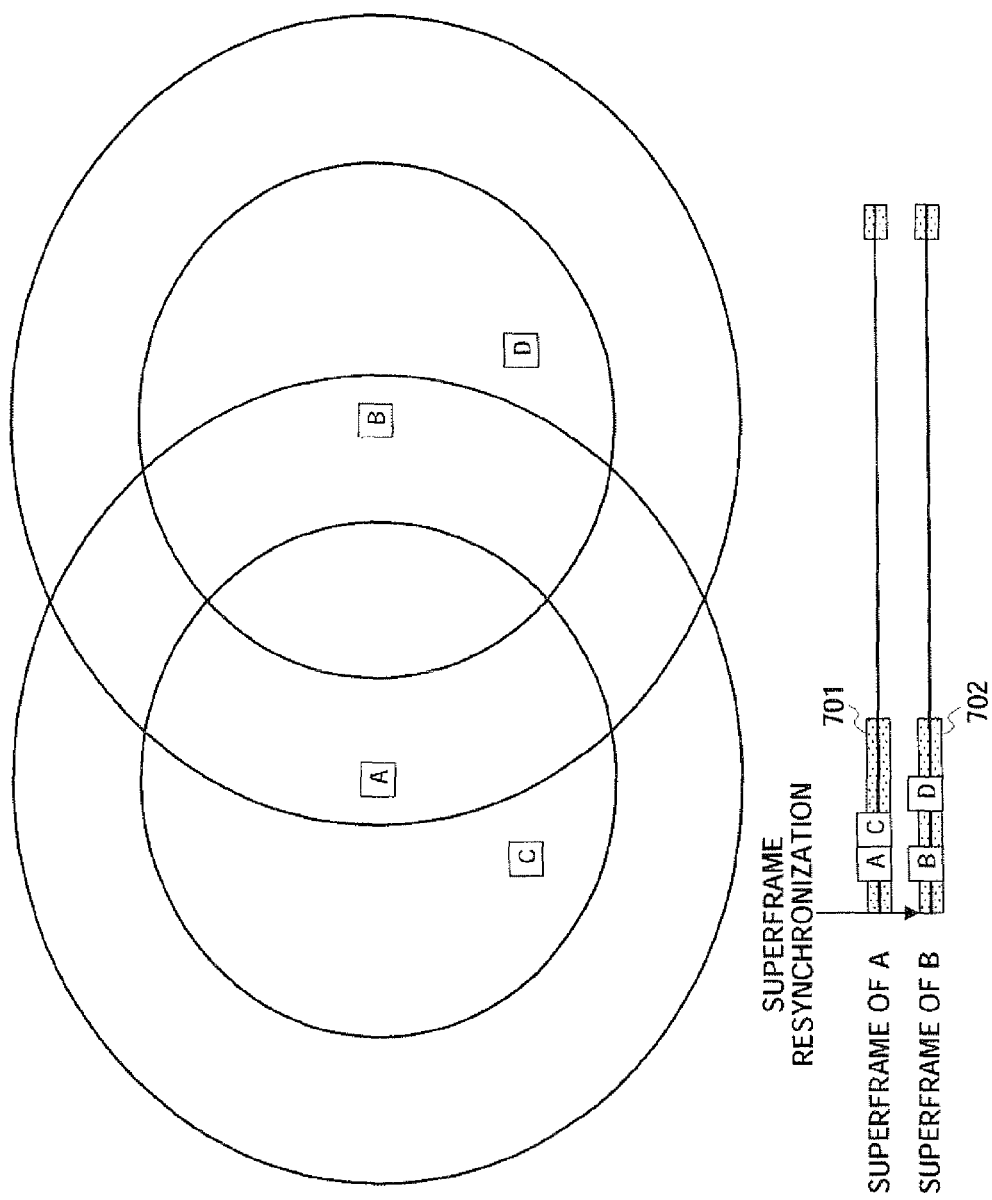
FIG. 14 illustrates beacon collision continuing from FIG. 13.

FIG. 13 and FIG. 14 illustrate such beacon collision. FIG. 13 and FIG. 14 show that beacon period groups are synchronized and have the same beacon period and therefore the beacons of terminal A and terminal B collide. In FIG. 13, "R" represents the signal reachable ranges of the synchronization tone signal and resynchronization tone signal, "r" represents the signal reachable ranges in wideband communication (and signal reachable ranges of the probe tone signal and FX probe tone signal). Further, in FIG. 13, terminal A and terminal C belong to the same superframe group and terminal B and terminal D belong to another same superframe group. Further, as shown in FIG. 13, the beacon slots of terminal A and terminal C are assigned to beacon period 701 of the superframe of terminal A and beacon slots of terminal B and terminal D are assigned to beacon period 702 of the superframe of terminal B.

In the condition of FIG. 13, terminal A and terminal B are not yet in signal reachable ranges of beacons mutually, and so the beacons of terminal A and terminal B do not collide. However, when terminal A and terminal B are in the range where beacons can be communicated, the beacons of terminal A and terminal B collide. That is, as shown in FIG. 14, when terminal B synchronizes with the superframe of terminal A by superframe resynchronization, beacon periods 701 and 702 of terminal A and terminal B are the same time slot. With the present embodiment, the beacon slots of terminal A and terminal B are the same slot, and therefore beacons collide between terminal A and terminal B. When beacon collision takes place, a procedure for re-affiliating a beacon needs to be taken, which consumes the precious file swapping time.

To avoid this, with the present embodiment, for example, for a predetermined period (for example, two to three seconds) from the time point a given superframe group joins (resynchronizes) another superframe group by a resynchronization tone signal, another beacon period is formed by all of these groups. That is, the beacon period of these groups is evacuated for a predetermined period to the position where the beacon period does not collide with the beacon period of another group. Then, when an upper empty slot is detected in the original beacon period, the beacon slot position of this group is moved to the upper empty slot (referred to as "evacuation operation"). Here, for a predetermined period from resynchronization, the beacon period is evacuated because, in a case where terminals are about to pass and where a terminal to swap files with does not come in the communication radius where wideband communication is possible, it is useless to continue the evacuating operation, and the beacon period is configured to return to the original slot position naturally.

Figure 15:
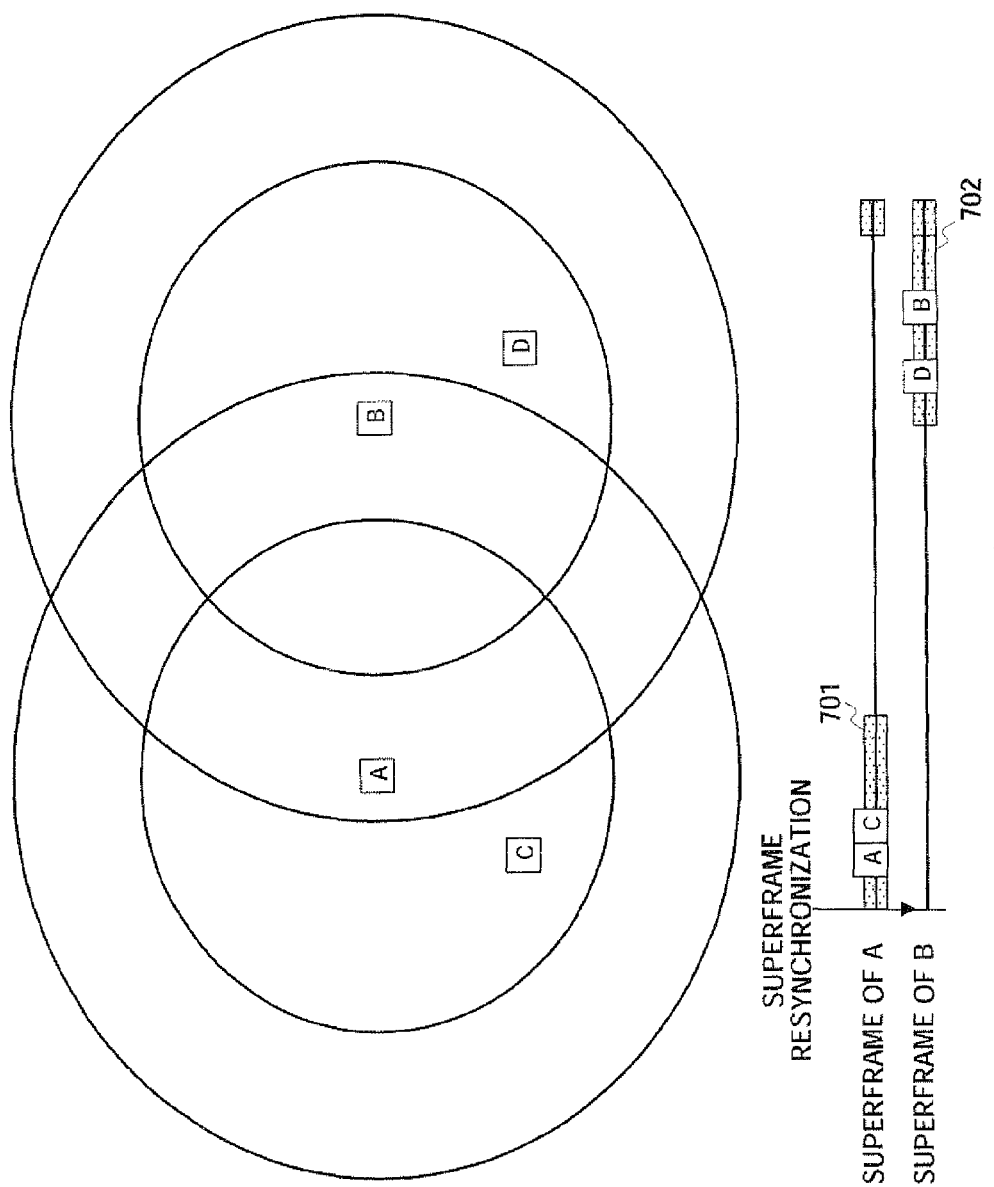
FIG. 15 illustrates an overview of a beacon collision evasion step according to Embodiment 2.
Figure 16:
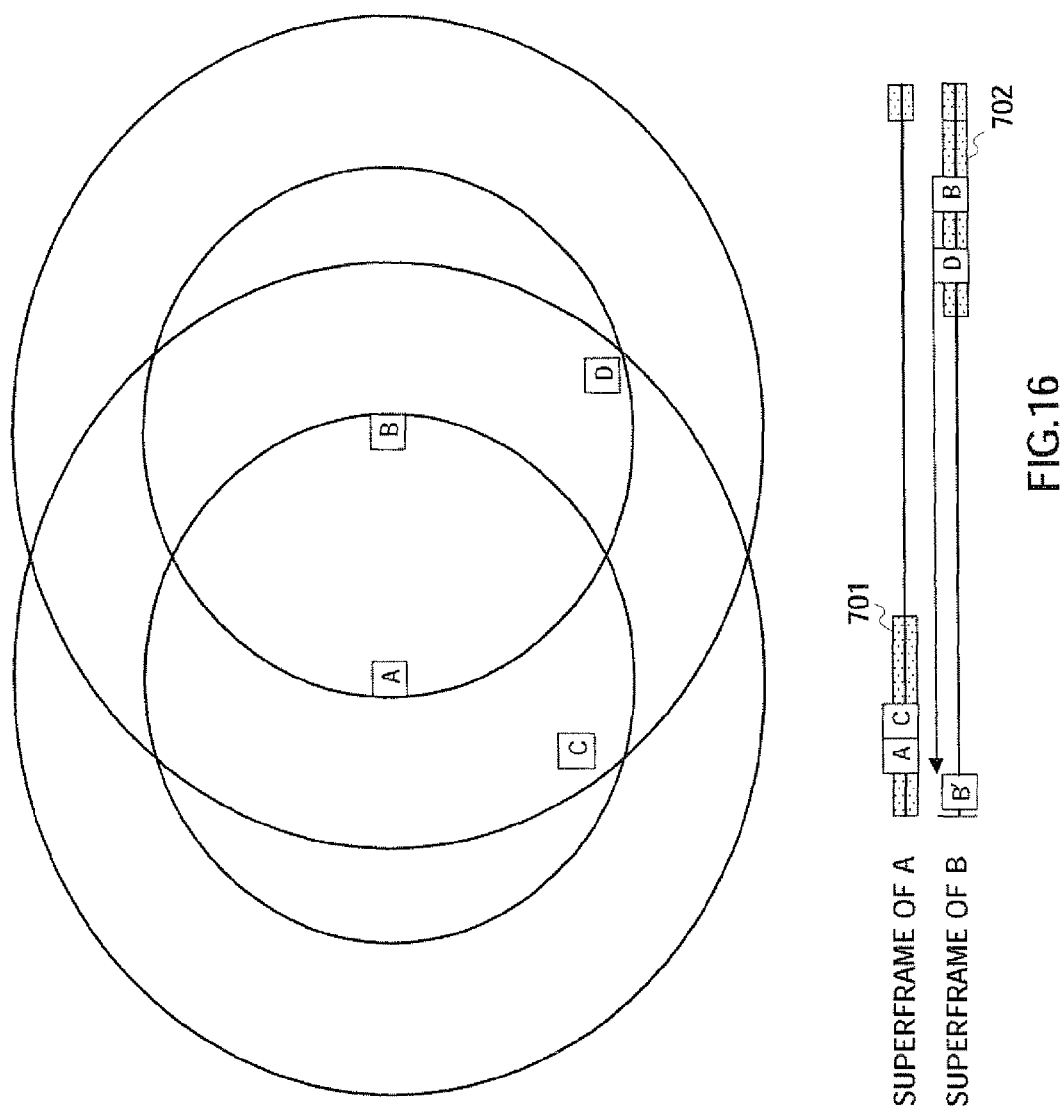
FIG. 16 is an illustration diagram continuing from FIG. 15.

FIG. 15 and FIG. 16 illustrate schematically beacon collision avoiding steps according to the present embodiment.

For example, as shown in FIG. 15, when a group of terminal B synchronizes with the superframe of the group of terminal A by resynchronization, the group of terminal B forms beacon period 702' in reverse order from the tail of the superframe. Then, as shown in FIG. 16, for example, terminal B detects the beacon period of the group of terminal A in the original position (that is, receives the beacon of the group of terminal A). Next, terminal B moves (evacuates) the beacon slot position of terminal B to the position (beacon slot position) that is judged empty based on the received beacon and neighbor information (for example, BPOIE in WiMedia) (see B' after move). Although not shown, after the beacon of terminal B evacuates to the superframe of terminal A (B' after move), the beacon of terminal D evacuates to an empty slot position in the superframe of terminal A. At this time, in the evacuating step and exclusive control according to, for example, the WiMedia scheme, from the time point in which each terminal discovers a beacon in a new beacon period group, each terminal sets up a movable flag and evacuates the beacon period sequentially, starting from the terminal transmitting the beacon in the slot of the highest priority in three superframes. As long as the scheme of determining the order is employed, the priority of beacon slots may be in any order.

Figure 17A:
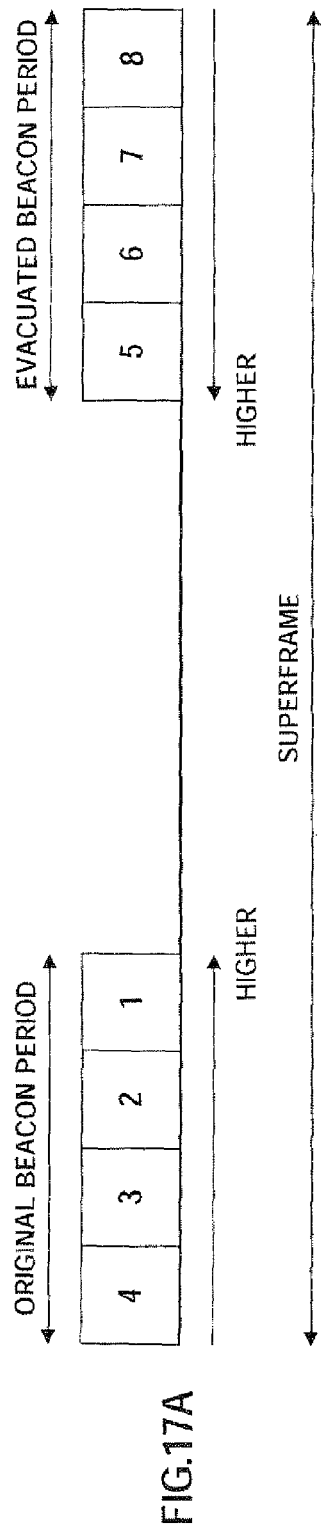
FIG. 17 shows examples of priority of beacon slots according to Embodiment 2.
Figure 17B:
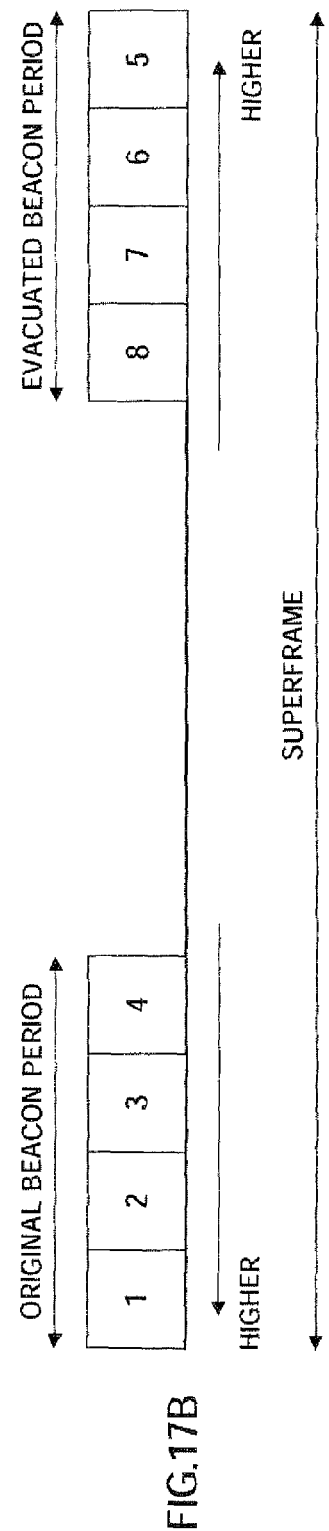

FIG. 17 shows an example of priority of beacon slots according to the present embodiment. In the example shown in FIG. 17A, the priority is the highest in the tail of the original beacon period and the priority of the evacuated beacon period is lower than any original beacon period slot. The priority in the evacuated beacon period is the highest in the head. Further, in the example shown FIG. 17B, the priority is the highest in the head of the original beacon period and the priority of the evacuated beacon period is lower than any beacon period slot. The priority in the evacuated beacon period is the highest in the tail. Further, the priority of the beacon slot is not limited to the above examples. If the priority of the evacuated beacon period is lower than the priority of the original beacon period, the priority in each beacon period may be random.

Figure 18:
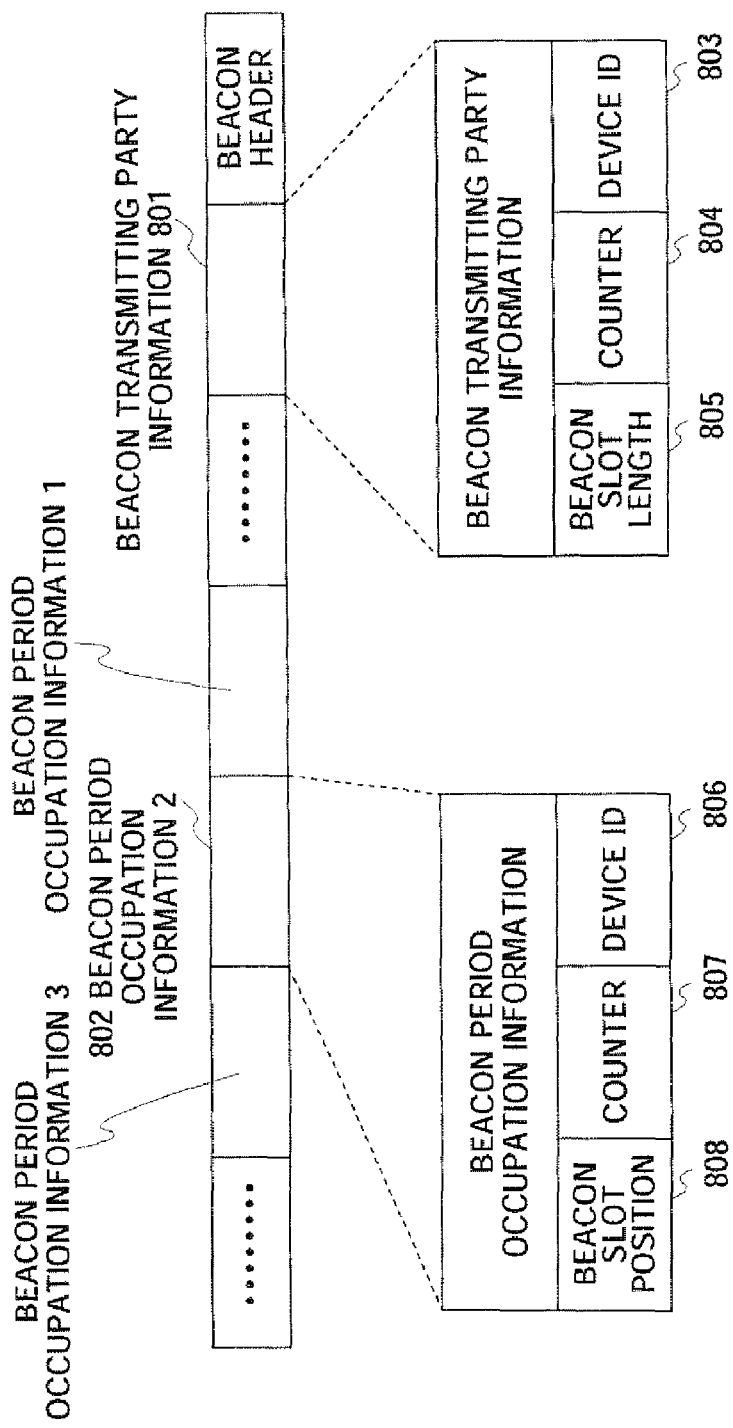
FIG. 18 shows a configuration of a beacon frame in a beacon period according to Embodiment 2.

FIG. 18 shows a beacon frame configuration in a beacon period.

In FIG. 18, beacon transmitting party information 801 is configured by describing device ID 803 of the terminal transmitting this beacon, counter value 804 on a counter and beacon slot length 805 learned by the terminal transmitting this beacon. Further, beacon period occupation information 802 is configured by describing device ID 803 and counter value 804 found in beacon transmitting party information 801 received by this terminal in an immediately preceding superframe and a slot position of the received beacon in device ID

806, counter value 807 and beacon slot position 808 per beacon. Further, the counter is provided in a beacon frame and a beacon slot state table (described later) received by this terminal. The information source of the beacon slot state table is a copy of the counter of a beacon frame and the counter of BPOIE.

Further, although a counter is provided in the beacon frame, the present embodiment is not limited to this and a flag may be used instead of the counter.

Beacon processing section 211 has recording section 212 that stores the beacon slot state table. The beacon slot state table refers to a table that records the occupation state in each beacon slot included in beacon transmitting party information 801 and beacon period occupation information 802.

FIG. 19 shows a format of the beacon slot state table stored in recording section 212 of beacon processing section 211.

As shown in FIG. 19, the beacon slot state table records slot number 901, device ID 902 of a terminal using this slot, use state 903 of the slot and type 904 of the slot per beacon slot number. Use state 903 shows whether or not the terminal in the applicable slot position is scheduled to change the slot position, and counter values 804 and 807 are set on this use state 903. Further, type 904 shows a type regarding whether a beacon is received in this slot (represented by "Beacon" in FIG. 19) or shows that this slot is occupied is reported by beacon period occupation information (represented by "BPOIE" in FIG. 19).

Beacon processing section 211 evacuates the beacon frame upon superframe resynchronization, and, if there is an empty slot in the original beacon period, carries out processing of moving the slot position of this terminal to the empty slot based on the beacon slot state table. Further, beacon processing section 211 has a move counter (not shown). This move counter counts superframes until the terminal starts moving the beacon slot position of this terminal, in other words, counts a predetermined number of times of waiting (for example, N times) when the priority of this terminal is the highest, and a value equal to or greater than two is usually set upon start of counting. Further, beacon processing section 211 generates beacon transmitting party information 801 and beacon period occupation information 802 and forms a beacon frame including management information. Further, beacon processing section 211 has a timer function for counting the slot positions and sends the formed beacon frame in the slot position of this terminal in a beacon period starting from an offset time.

Next, the operation of the wireless communication apparatus having the above configuration will be described. A case where a certain terminal swaps files with other terminal when passing each other, will be assumed and described.

Figure 20:
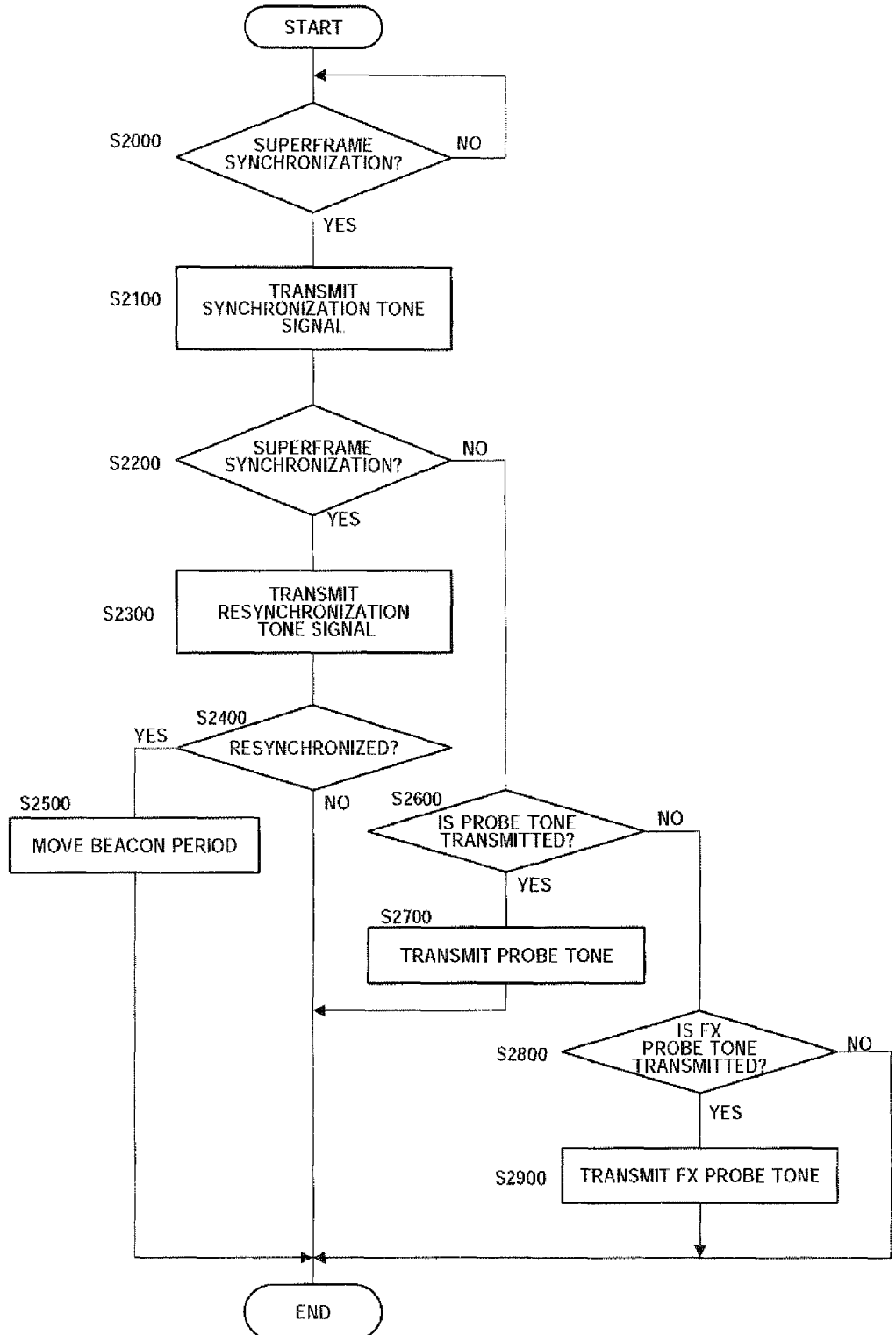
FIG. 20 is a flowchart showing a tone signal transmission algorithm in a file swapping operation of the wireless communication apparatus according to Embodiment 2.

FIG. 20 is a flowchart showing a tone signal transmitting algorithm in the file swapping operation of the wireless communication apparatus according to the present embodiment. This algorithm is executed by MAC processing section 210.

First, when judging to acquire superframe synchronization by a timer included in the wireless communication apparatus (S2000: YES), synchronization processing section 142 first transmits a synchronization tone signal through synchronization tone signal processing section 131 of narrowband communication section 130a (S2100). Next, when judging to carry out superframe resynchronization (S2200: YES) because the synchronization occurrence count is equal to or more than a predetermined count (for example, N times), resynchronization processing section 143 transmits a resynchronization tone signal through resynchronization tone signal processing section 132 in narrowband communication section 130a (S2300) and judges whether or not resynchronization with another superframe group is acquired (S2400). If resynchronization with another superframe group is acquired as a result of this judgment (S2400: YES), the flow proceeds to step S2500, and, if resynchronization is not acquired (S2400: NO), the series of the above processings are finished.

In step S2500, beacon processing section 211 moves (evacuates) for a predetermined period (for example, two to three seconds) the beacon period of the terminal to a period apart from the original beacon period. Further, the subsequent evacuation operation is carried out by moving the beacon period to the empty slot position in the superframe of another group according to the priority determined as described above.

On the other hand, if resynchronization with another superframe group is not acquired as a result of judgment in S2200 (S220: NO), when judging to transmit the probe tone signal according to commands from the upper layer (S2600: YES), probe processing section 144 transmits the probe tone signal through probe tone signal processing section 133 in narrowband communication section 130a to search for a neighbor terminal (S2700) Then, a series of processings are finished.

By contrast with this, if it is judged not to transmit the probe tone signal as a result of judgment in step S2600 (S2600: NO), when judging to transmit the FX probe tone signal (S2800: YES) because resynchronization with another superframe takes place by receiving the resynchronization tone signal, probe processing section 144 transmits the FX probe tone signal through FX probe tone signal processing section 134 in narrowband communication section 130a to search for a terminal to swap files with (S2900). Then, a series of processings are finished.

Figure 21:
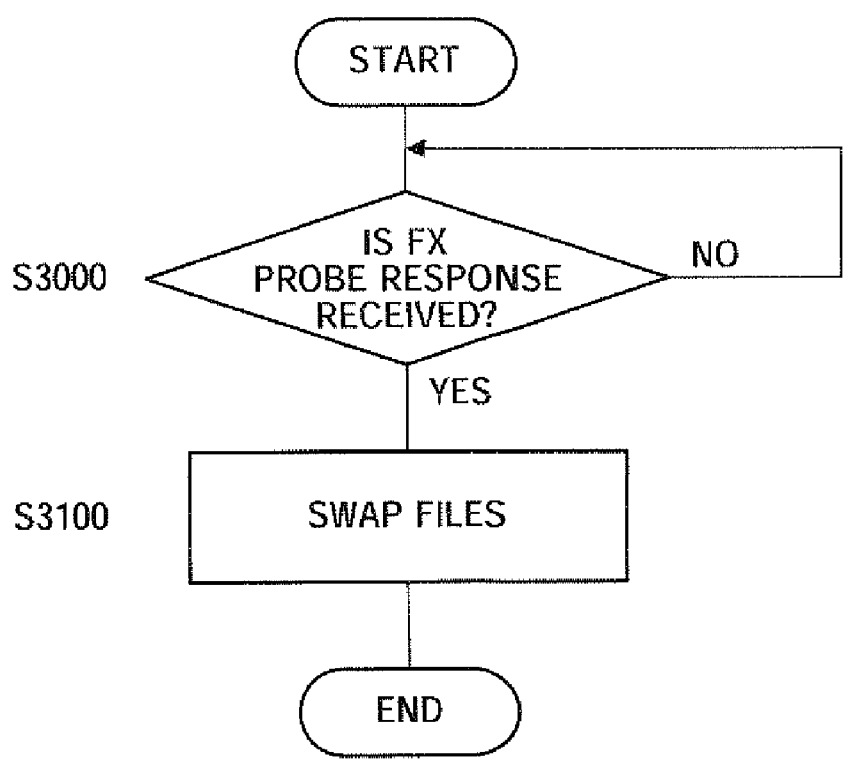
FIG. 21 is a flowchart showing a file swapping algorithm in the file swapping operation of the wireless communication apparatus according to Embodiment 2.

FIG. 21 is a flowchart showing a file swapping algorithm in the file swapping operation in the wireless communication apparatus according to the present embodiment. This algorithm is executed by MAC processing section 210.

First, frame processing section 141a judges whether or not the FX probe response is received through wideband communication section 120 (S3000). If the FX probe response is received as a result of this judgment (S3000: YES), frame processing section 141a reports that the FX probe response is received, to upper layer processing section 150 (here, to the file swapping application) and upper layer processing section 150 executes file swapping processing (S3100).

Next, beacon slot positioning processing carried out at the end of the beacon period will be described.

Figure 22:
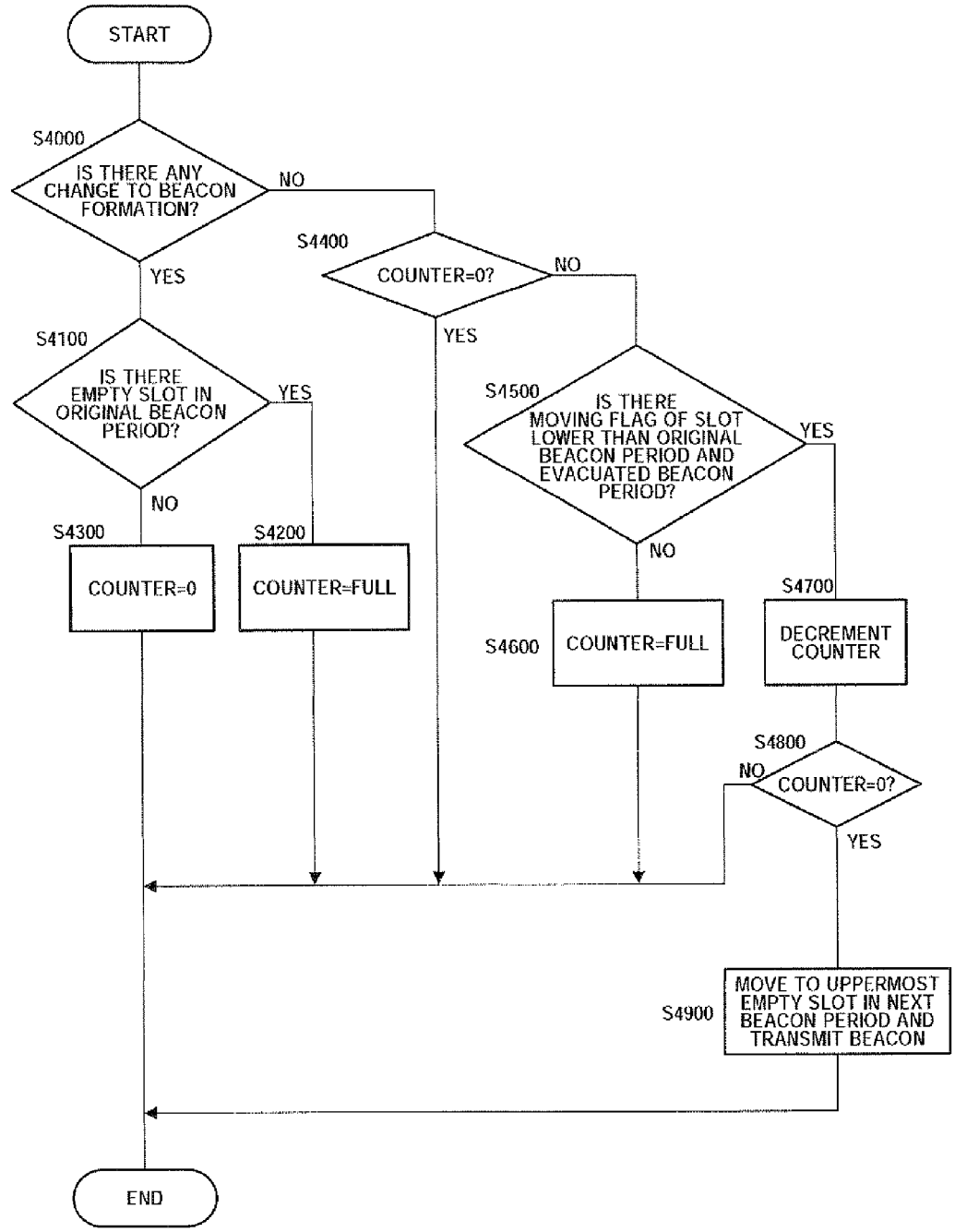
FIG. 22 is a flowchart showing a beacon slot positioning processing of the wireless communication apparatus according to Embodiment 2.

FIG. 22 is a flowchart showing beacon slot positioning processing in beacon processing section 211.

First, beacon processing section 211 judges whether or not there is a change to the previous beacon slot configuration (i.e. beacon formation), based on the beacon slot state table stored in recording section 212 (S4000). If there is a change to beacon formation as a result of this judgment (S4000: YES), beacon processing section 211 judges whether or not there is an empty slot in the original beacon period (S4100). If there is an empty slot in the original beacon period as a result of this judgment (S4100: YES), the move counter (in FIG. 20, simply represented as "counter" for ease of illustration) is reset to "Full" (here, for example three), representing the maximum value of the counter value (S4200). By contrast with this, if there is no empty slot in the original beacon period (S4100: NO), the move counter is reset to zero (S4300).

On the other hand, if there is no change to beacon formation as a result of judgment in S4000, that is, if there is no change to the previous beacon slot position (S4000: NO), beacon processing section 211 proceeds to the count down operation for moving the slot position to the original beacon period.

That is, beacon processing section 211 judges whether or not the move counter shows zero (S4400), and, if the move counter shows zero (S4400: YES), finishes processing immediately due to a state where there is no empty slot already in the original beacon period.

By contrast with this, if the move counter shows one or greater (S4400: NO), beacon processing section 211 judges whether or not there is a moving flag of a slot lower than the original beacon period and the evacuated beacon period, that is, whether or not there is a moving flag of a beacon or BPOIE belonging to the slot in the lowest order of the priority in which the original beacon slot and the evacuated beacon period are aligned in order of the priority. If there is no moving flag of the lower slot as a result of this judgment (S4500: NO), the move counter is set to Full (here, three) (S4600).

On the other hand, if there is a moving flag of the lower slot (S4500; YES), beacon processing section 211 decrements the move counter by one (S4700) because the terminal comes to have a right to preferentially move the beacon slot position. Then, at the time point in which the counter value on the move counter becomes zero (S4800: YES), in the next beacon period, beacon processing section 211 moves the beacon slot position of the terminal to the uppermost empty slot of the original beacon period and transmits the beacon through wideband communication section 120 (S4900).

That is, the algorithm of beacon slot positioning processing in beacon processing section 211 includes the steps where; 1. a move counter is established when there is an empty slot in an upper slot (that is, an upper slot of a smaller slot number but an upper slot in a beacon period of the original slot position if the beacon period is moved) than the beacon slot position of the terminal; 2. surrounding terminals relay information of the move counter and information showing what number the slot is; and 3. when it is judged N consecutive times (for example, three times) that the priority of beacon information of the terminal is higher in the beacon received by the terminal, relayed information and the move counter transmitted by the terminal, the beacon slot position of the terminal is moved to an empty slot.

In this way, according to the present embodiment, the beacon period is evacuated upon superframe resynchronization and, if there is an empty slot in the original beacon period, the beacon slot position of the terminal is moved to the empty slot, so that it is possible to avoid beacon collision upon superframe resynchronization. Consequently, when the tone signal synchronization scheme and the beacon period is combined, it is possible to secure the time for swapping files at maximum and swap a great amount of data by the file swapping application.

Embodiment 3

Figure 23:
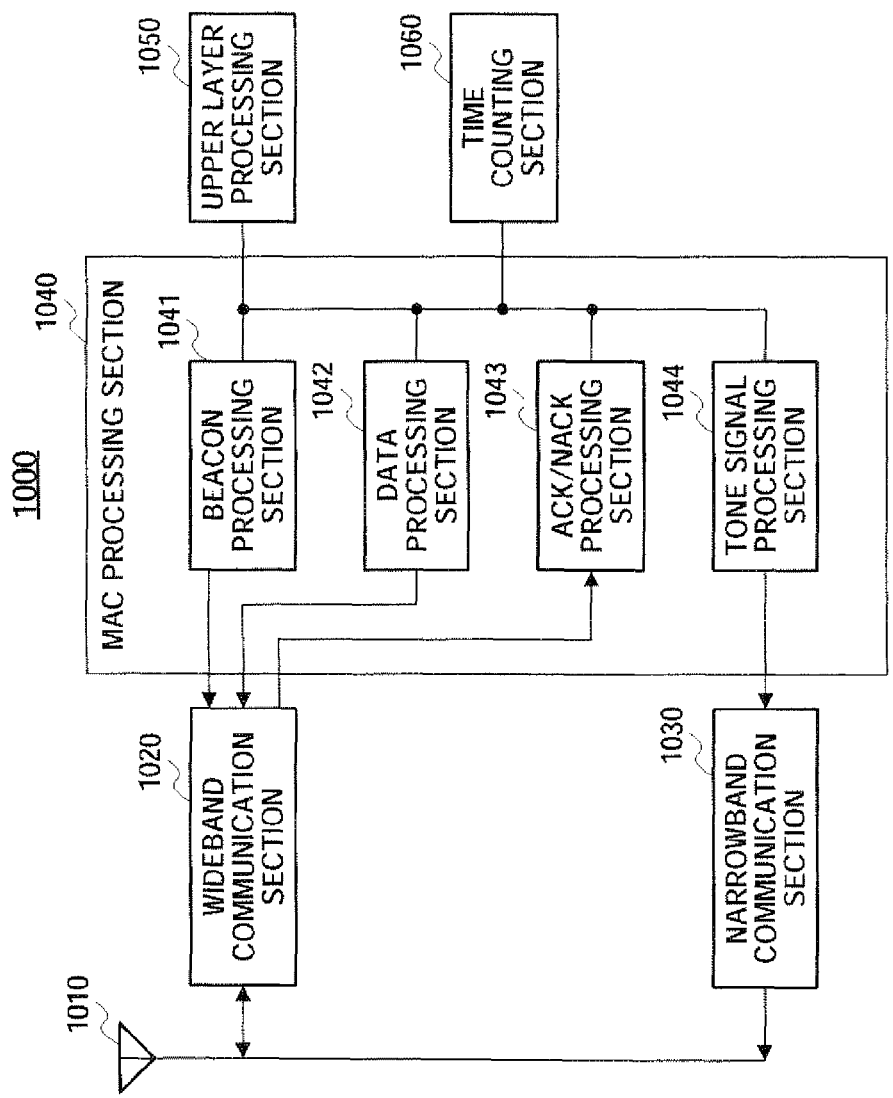
FIG. 23 is a block diagram showing a configuration of the wireless communication apparatus (i.e. access point) according to Embodiment 3 of the present invention.
Figure 24:
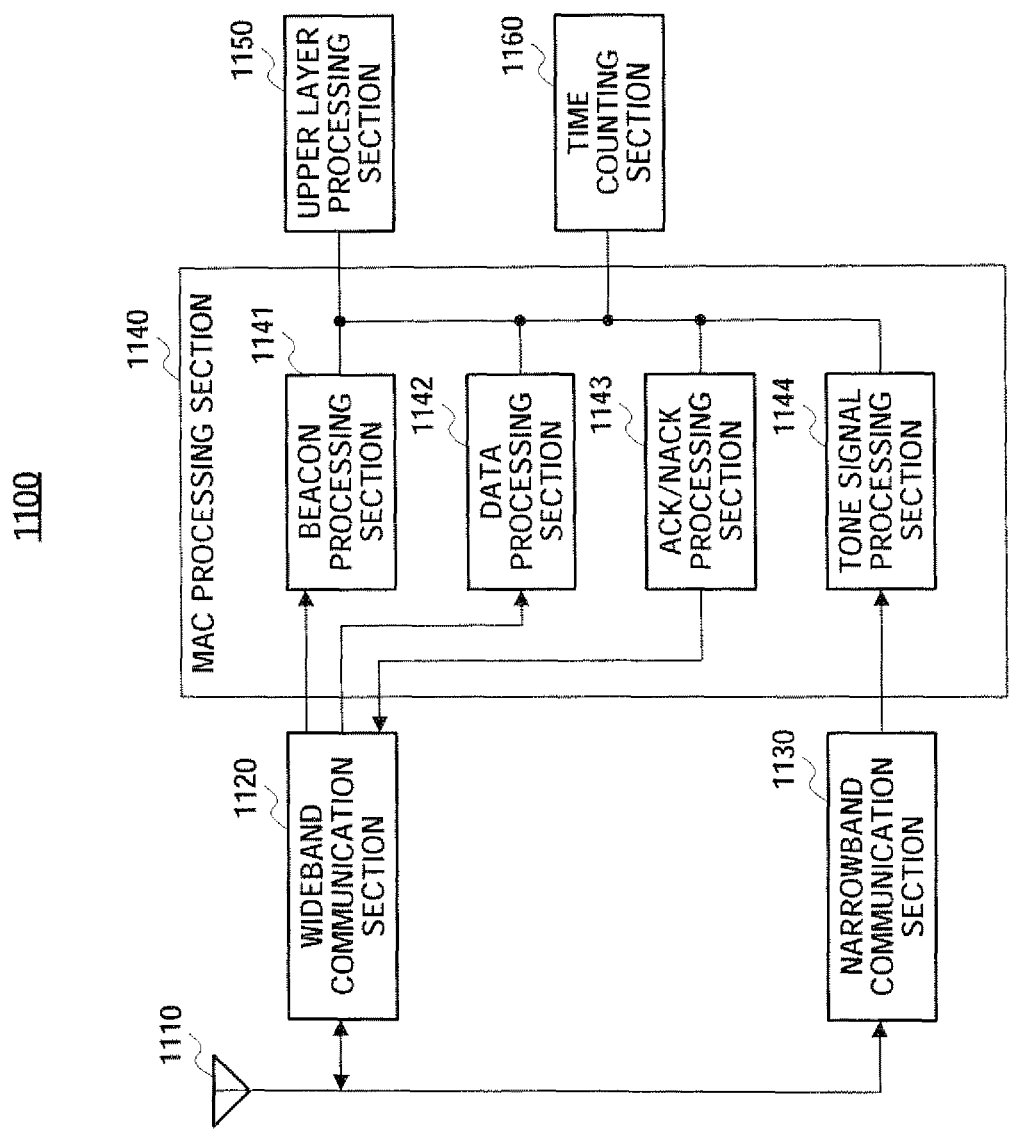
FIG. 24 is a block diagram showing a configuration of the wireless communication apparatus (i.e. mobile terminal) according to Embodiment 3.

FIG. 23 is a block diagram showing a configuration of the wireless communication apparatus (hereinafter, "access point") according to Embodiment 3 of the present invention. FIG. 24 is a block diagram showing a configuration of the wireless communication apparatus (hereinafter, "mobile terminal") according to Embodiment 3 of the present invention.

<Synchronization Scheme>

The present invention focuses upon the synchronization scheme carried out between above access point 1000 and mobile terminal 1100. The present embodiment proposes a scheme of acquiring communication synchronization between mobile terminal 1100 and access point 1000 according to a scheme similar to the synchronization scheme carried out by autonomous distribution. By acquiring synchronization by a tone signal between access point 1000 that transmits information and mobile terminal 1100 that receives information, only during the time slot in which access point 1000 transmits the tone signal, mobile terminal 1100 enters tone signal reception waiting mode. The present embodiment is directed to reducing the reception waiting time for the wideband signal in mobile terminal 1100 that has a little chance to come close to access point 1000. By this means, it is possible to reduce power consumption when mobile terminal 1100 stands by. Further, with the present embodiment, only access point 1000 transmits a tone signal and mobile terminal 1100 synchronizes the stand by time with transmission of the tone signal.

Figure 25:
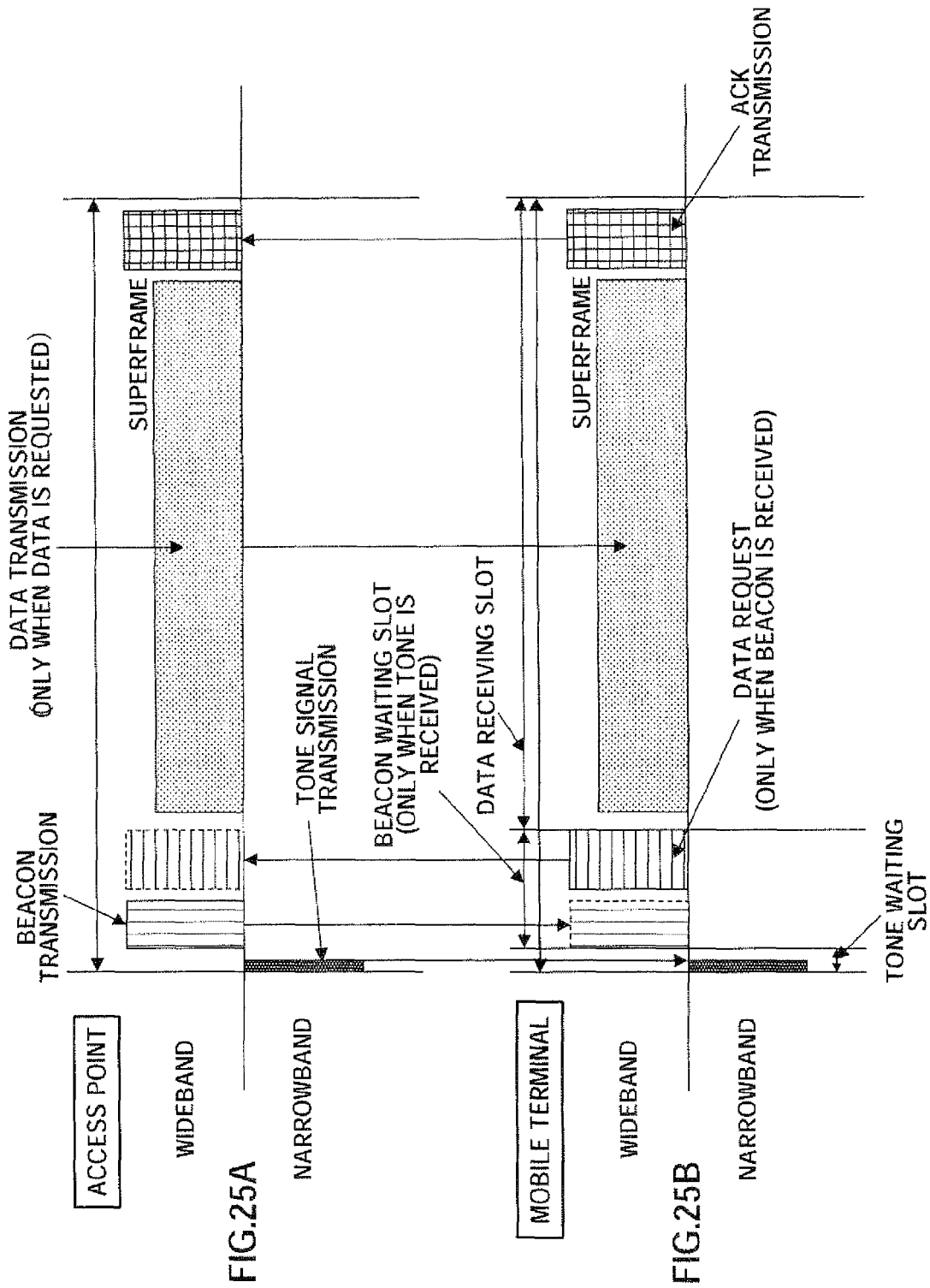
FIG. 25 shows superframe configurations of an access point and the wireless communication apparatus (i.e. mobile terminal) according to Embodiment 3.

With the present embodiment, access point 1000 transmits at all times the tone signal which is a synchronization signal of a narrowband signal prior to a beacon of millimeter wave UWB which is a synchronization signal of a wideband signal. This tone signal is transmitted with the intensity such that the area receiving this signal becomes a wider reachable range than a wideband signal. FIG. 25 shows superframe structures of access point 1000 and mobile terminal 1100. With the present embodiment, the superframe is formed with a tone slot for transmitting and receiving a tone signal, a beacon slot for transmitting and receiving the beacon and a data slot for transmitting and receiving, for example, a data frame.

FIG. 25 shows a transmission schedule of access point 1000. Access point 1000 transmits a narrowband tone signal first and then transmits the beacon using a wideband signal. When access point 1000 receives a data request signal of a wideband signal from mobile terminal 1100, a data frame corresponding to a data request is transmitted in the period in the superframe. If necessary, ACK is received from mobile terminal 1100 receiving data corresponding to the data request. Further, when transmission of the data frame corresponding to the data request fails, access point 1000 retransmits the same data frame. If access point 1000 does not receive the data request signal of a wideband signal from mobile terminal 1100, access point 1000 enters sleep mode in the superframe and does not transmit a wideband signal or a narrowband signal. Then, access point 1000 transmits a narrowband tone signal in the next superframe and then transmits the beacon using a wideband signal. Access point 1000 only repeats transmitting the beacon using the narrowband tone signal and the wideband signal per superframe until the data request signal is received.

By contrast with this, FIG. 25B shows a superframe configuration of mobile terminal 1100. First, mobile terminal 1100 is placed in the tone waiting slot in which mobile terminal 1100 enters tone signal reception waiting mode from the start of the superframe. Subsequently, mobile terminal 1100 is placed in a beacon waiting slot only when the tone signal is received successfully. That is, when mobile terminal 1100 does not receive a tone signal, mobile terminal 1100 does not enter the mode for successfully receiving a wideband signal such as a beacon. Mobile terminal 1100 transmits the data request signal when mobile terminal 1100 receives the beacon and synchronizes with access point 1000 in a wide band. Mobile terminal 1100 enters sleep mode in the superframe and does not receive the wideband signal and the narrowband signal when mobile terminal 1100 does not receive the tone signal successfully. However, when the condition where the tone signal is not received continues N consecutive times (for N superframes), mobile terminal 1100 enters tone signal reception waiting mode at all timings in the superframe. Then, mobile terminal 1100 is able to synchronize with the access point that transmits the tone signal at a timing other than the current tone waiting slot. Then, mobile terminal 1100 restarts the operation using the timing at which the tone signal is received from the access point as the superframe start time. Mobile terminal 1100 is able to try resynchronization with the neighboring access point once in N times and enter sleep mode for the most of the time in the superframe period other than the period in which resynchronization is carried out.

Next, the method of calculating the number of superframes (resynchronization count) counted until this resynchronization is carried out again, will be described.

Figure 28:
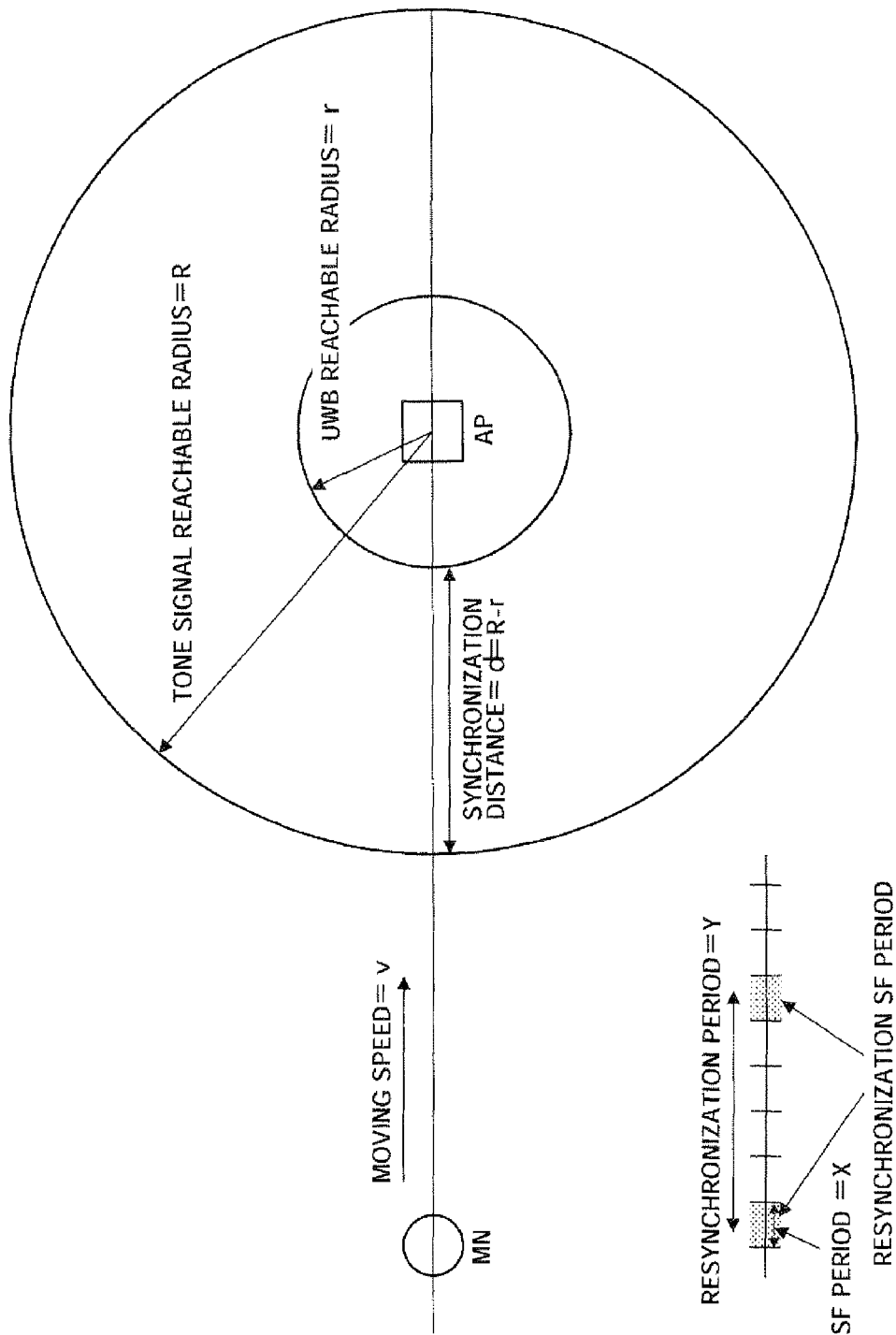
FIG. 28 illustrates calculation of a reachable distance of a tone signal.

FIG. 28 illustrates calculation for the superframe period and resynchronization count. Assume that the walking speed of a person is vm/s, the distance for capturing a synchronization tone signal is dm (=R−r) and power can only be consumed by the ratio of W(100×w(%)). Here, speed v, distance d and ratio w are constants. If the superframe period is Xsec and the resynchronization count is Y times, following equation 5 can be acquired.

$$X \times Y \times v = d \qquad \text{(Equation 5)}$$

Further, when the length of a tone waiting slot is tsec, $$t/X + 1/Y < W \qquad \text{(Equation 6)}$$

Equation 7 can be acquired by changing equation 5.

$$Y = d/(v \times X) \qquad \text{(Equation 7)}$$

By substituting equation 7 in equation 6, equation 8 can be acquired.

$$v \times X^2 - d \times W \times X + d \times t < 0 \qquad \text{(Equation 8)}$$

Equation 8 is a quadratic inequality of X. X is determined by solving equation 8. Further, Y is determined by substituting X in equation 5.

After determining superframe period X, a tone waiting slot, beacon waiting slot and data receiving slot may be determined.

<Access Point 1000>

Next, the configuration of access point 1000 will be described. Roughly speaking, access point 1000 shown in FIG. 23 has antenna 1010, wideband communication section 1020, narrowband communication section 1030, MAC processing section 1040, upper layer processing section 1050 and time counting section 1060. Here, access point 1000 is targeted at, for example, automatic ticket gates in airports or train stations and equipment such as automatic cashiers or automatic dispensers inconvenience stores.

Antenna 1010 is formed with, for example, a plurality of directional antennas each covering each sector. The communication range is determined by controlling by a directivity controlling section (not shown) each directional antenna forming antenna 1010.

Wideband communication section 1020 transmits and receives a millimeter wave UWB signal through antenna 1010. As described above, the millimeter wave UWB signal refers to a signal of an extremely short transmission distance and a very wide band. The millimeter wave UWB signal utilized in the present embodiment generally consumes great power for these wideband characteristics.

Narrowband communication section 1030 transmits an unmodulated tone signal of a narrowband through antenna 1010. The tone signal is transmitted to acquire synchronization with mobile terminal 1100 in a narrow band. The narrowband tone signal consumes little power. Consequently, by using wideband communication and narrowband communication in combination, it is possible to reduce power consumption in the entire apparatus.

MAC processing section 1040 carries out MAC protocol processing. MAC processing section 1040 has, for example, beacon processing section 1041, data processing section 1042, ACK/NACK processing section 1043 and tone signal processing section 1044.

Upper layer processing section 1050 generates a data frame matching a data request from mobile terminal 1100. Upper layer processing section 1050 controls wideband communication section 1020 and narrowband communication section 1030 so as to transmit a synchronized signal of a narrowband signal and then transmit a synchronized signal of a wideband signal.

Time counting section 1060 measures the time of a superframe and each slot in the superframe and reports the time to each processing section.

Beacon processing section 1041 carries out processing for transmitting the beacon in a wide band. Further, a configuration may be possible where a wideband signal other than the beacon is transmitted to acquire synchronization with mobile terminal 110 in a wide band.

When receiving the data request from mobile terminal 1100, data processing section 1042 carries out processing for transmitting the data frame generated by upper layer processing section 1050 to mobile terminal 1100 using a wideband signal through wideband communication section 1020.

ACK/NACK processing section 1043 carries out processing of receiving an ACK frame or NACK frame as the transmission result of the data frame from mobile terminal 1100. Then, ACK/NACK processing section 1043 reports the transmission result of the data frame to upper layer processing section 1050. Here, access point 1000 transmits at least one data frame to mobile terminal 1100. For example, when access point 1000 transmits only one data frame and an ACK frame is received, upper layer processing section 1050 completes transmission processing of the data frame. Further, when a NACK frame is received, upper layer processing section 1050 generates the same data frame and passes the data frame to data processing section 1042. Then, data processing section 1042 carries out processing for retransmitting the same data frame in the next superframe. By contrast with this, when access point 1000 transmits a plurality of data frames and an ACK frame is received, upper layer processing section 1050 generates the next data frame and passes the data frame to data processing section 1042. Then, data processing section 1042 carries out processing for transmitting the next data frame in the next superframe. When receiving the NACK frame, upper layer processing section 1050 generates the same data frame and passes the data frame to data processing section 1042. Then, data processing section 1042 carries out processing for retransmitting the same data frame in the next superframe.

Tone signal processing section 1044 carries out processing for transmitting the applicable transmission tone signal according to the time reported from time counting section 1060. To be more specific, tone signal processing section 1044 carries out processing of generating a narrowband synchronization tone signal.

<Mobile Terminal 1100>

Next, the configuration of mobile terminal 1100 will be described. Mobile terminal 1100 shown in FIG. 24 has a file swapping application, and, roughly speaking, has antenna 1110, wideband communication section 1120, narrowband communication section 1130, MAC processing section 1140, upper layer processing section 1150 and time counting section 1160. As mobile terminal 1100, there are terminals having file swapping applications such as mobile terminals, notebook personal computers, mobile telephones, game machines and mobile players.

Antenna 1110 is formed with, for example, a plurality of directional antennas each covering each sector. The communication range is determined by controlling by a directivity controlling section (not shown) each directional antenna forming antenna 1110.

Wideband communication section 1120 transmits and receives a millimeter wave UWB signal through antenna 1010. As described above, the millimeter wave UWB signal refers to a signal of an extremely short transmission distance and a very wide band. The millimeter wave UWB signal utilized in the present embodiment generally consumes great power for these wideband characteristics.

Narrowband communication section 1130 receives an unmodulated narrowband tone signal through antenna 1010. Power consumed to wait for reception of a narrowband tone signal is little. Consequently, by using wideband communication and narrowband communication in combination, it is possible to reduce power consumption in the entire apparatus.

MAC processing section 1140 carries out MAC protocol processing. MAC processing section 1140 has, for example, beacon processing section 1141, data processing section 1142, ACK/NACK processing section 1143 and tone signal processing section 1144.

Upper layer processing section 1150 carries out processing of the received data frame. For example, upper layer processing section 1150 carries out processing of recording the data frame in the recoding section of mobile terminal 1100.

Time counting section 1160 measures the time of a superframe and each slot in the superframe and reports elapse of the time to each processing section.

Beacon processing section 1141 receives a beacon in a wide band. With the present embodiment, before the tone signal is received from access point 1000, beacon processing section 1141 is in sleep mode. After having received the tone signal, beacon processing section 1141 enters operation mode. Sleep mode refers to mode where power supply to beacon processing section 1141 is off or less than power supply of when beacon processing section 1141 operates.

Data processing section 1142 carries out processing for passing the data frame in the superframe to upper layer processing section 1150. Further, upper layer processing section 1150 carries out error check of the data frame. Then, when receiving a data frame without error, upper layer processing section 1150 generates an ACK frame. Upper layer processing section 1150 passes the ACK frame to ACK/NACK processing section 1143. Further, when receiving a data frame with error, upper layer processing section 1150 generates the NACK frame. Upper layer processing section 1150 passes the NACK frame to ACK/NACK processing section 1143.

ACK/NACK processing section 1143 carries out processing for transmitting the ACK frame or NACK frame as the result of receiving the data frame, to access point 1000. For example, when the data frame is successfully received, ACK/NACK processing section 1143 reports to upper layer processing section 1150 that the next data frame will be received. When reception of the data frame fails, ACK/NACK processing section 1143 reports to upper layer processing section 1150 that the same data frame will be received again.

Tone signal processing section 1144 carries out processing for reception depending on the time reported from time counting section 1160. To be more specific, tone signal processing section 1044 carries out processing for passing the received narrowband synchronization tone signal to upper layer processing section 1150. This tone signal enters sleep mode upon normal stand-by, so that power consumption is reduced.

<Operation Flowchart of Access Point 1000>

Figure 26:
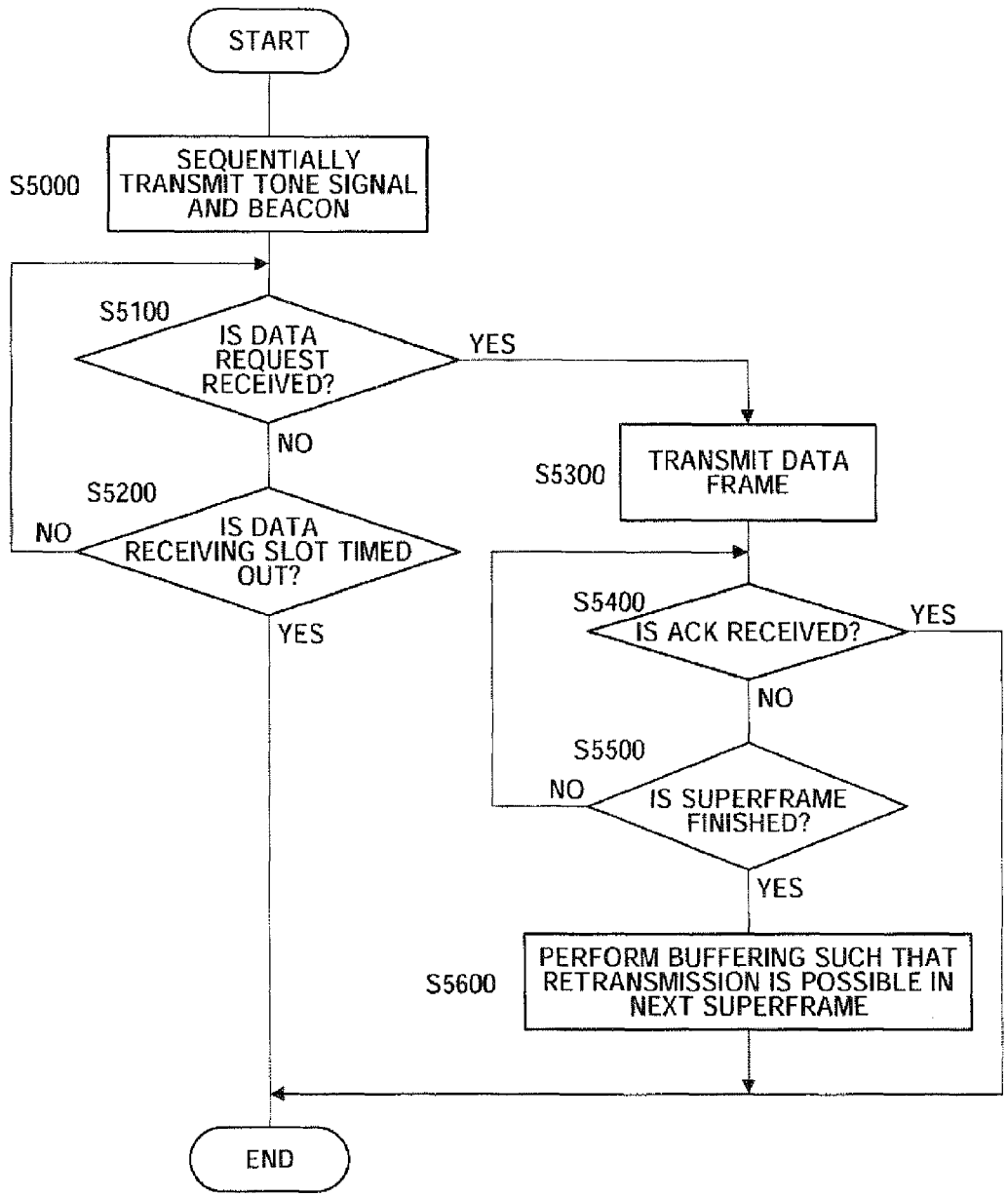
FIG. 26 is a flowchart showing processings of the access point according to Embodiment 3 from the superframe start.

Next, referring to FIG. 23 and FIG. 26, the operation flowchart of access point 1000 will be described.

When the superframe start time comes, access point 1000 sequentially transmits a tone signal and beacon to narrowband communication section 1030 and wideband communication section 1020, respectively (S5000). Then, upper layer processing section 1050 judges whether or not the data request signal is received from mobile terminal 1100 (S5100). If the data request signal is not received (S5100: NO), upper layer processing section 1050 judges either in the data receiving slot or out (S5200). If in the data receiving slot (S5200: NO), the flow returns to step S5100. If the data request signal is received (S5100: YES), wideband communication section 1020 transmits the data frame matching the data request (S5300) Then, upper layer processing section 1050 judges whether or not the ACK frame is received (S5400). If the ACK frame is not received (S5400: NO), upper layer processing section 1050 judges whether or not the superframe is finished (S5500). If the superframe is not finished (S5500: NO), the flow returns to step S5400. In this way, access point 1000 waits for reception of the ACK frame (S5400 and S5500). If the superframe is finished without receiving an ACK frame, upper layer processing section 1050 records that retransmission of the data frame is carried out in the next superframe and finishes processing (S5600).

<Operation Flowchart of Mobile Terminal 1100>

Figure 27:
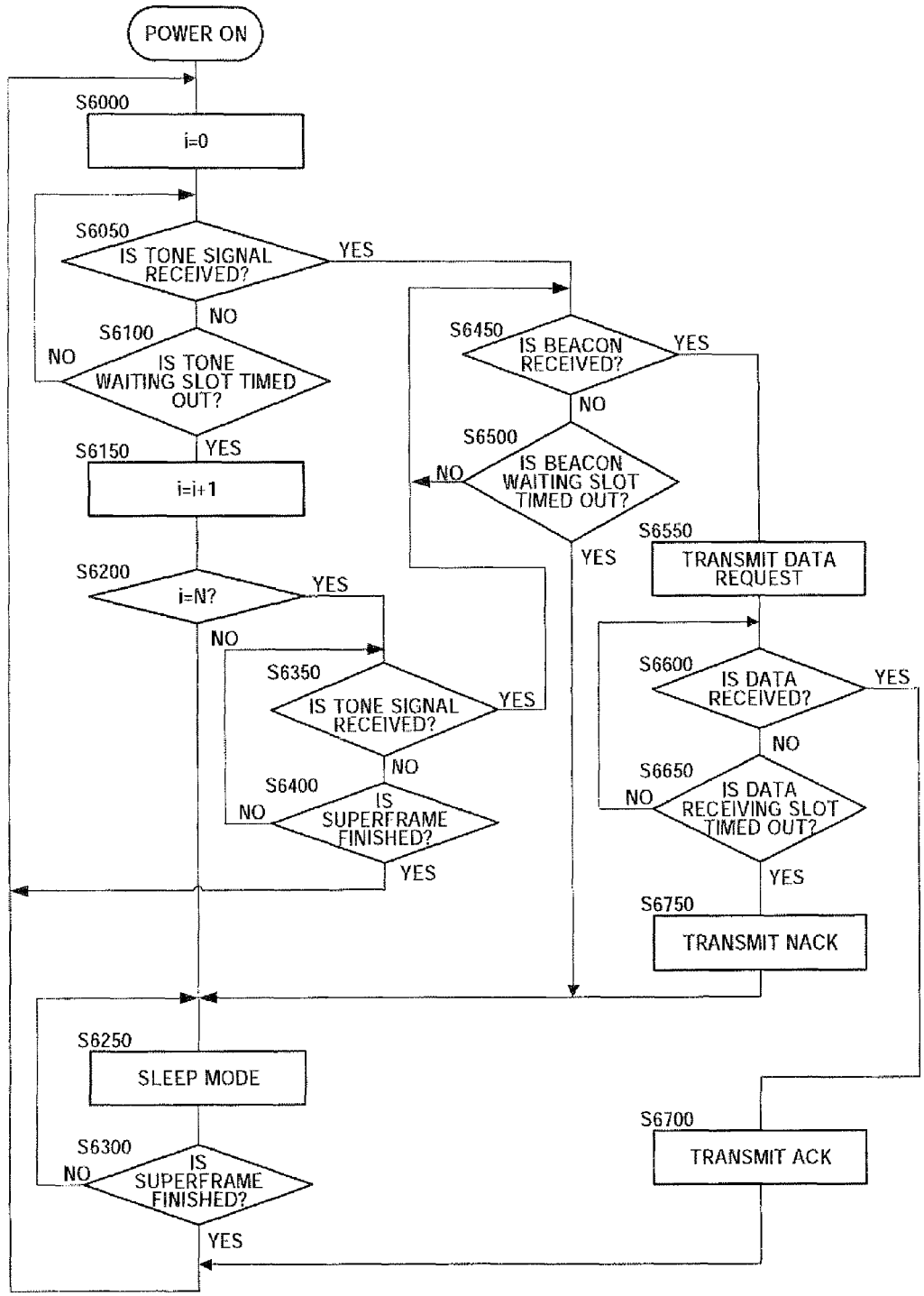
FIG. 27 is a flowchart showing processings of the wireless communication apparatus (i.e. mobile terminal) according to Embodiment 3 from the superframe start.

Next, processing of mobile terminal 1100 will be described referring to FIG. 24 and FIG. 27. When mobile terminal 1100 is powered on, the operation flowchart shown in FIG. 27 is repeated until mobile terminal 1100 is powered off.

When the superframe starts, upper layer processing section 1150 sets default value "0" for inner variable i. Upper layer processing section 1150 judges whether or not the tone signal is received in the tone waiting slot (S6050). If the tone signal is not received (S6050: NO), upper layer processing section 1150 judges either in the tone waiting slot or out (S6100). If in the tone waiting slot (S6100: NO), the flow returns to step S6050. In this way, mobile terminal 1100 places narrowband communication section 1130 in tone signal reception waiting mode (S6050). If mobile terminal 1100 does not receive the tone signal in the tone waiting slot (S6100: YES), upper layer processing section 1150 adds one to inner variable i for acquiring resynchronization. Then, upper layer processing section 1150 judges whether or not i is equal to N (S6200). If inner variable i is less than N (where N is an integer equal to or greater than one) (S6200: NO), upper layer processing section 1150 enters sleep mode in the superframe (S6250). Then, upper layer processing section 1150 judges whether or not the superframe is finished (S6300). If the superframe is not finished (S6300 NO), upper layer processing section 1150 maintains sleep mode (S6250). If the superframe is finished (S6300: YES), the flow returns to step S6000. Then, narrowband communication section 1130 is placed in tone signal reception waiting mode in the next superframe (S6050). If inner variable i is equal to N (S6200: YES), upper layer processing section 1150 places narrowband communication section 1130 in tone signal reception waiting mode over the entire superframe period (S6350). If the superframe is finished (S6400: NO), the flow returns to step S6000.

If the tone signal is received in step S6050 or in step S6350, upper layer processing section 1150 places narrowband communication section 1130 from sleep mode to operation mode. Then, upper layer processing section 1150 judges whether or not the beacon is received (S6450). If the beacon is not received (S6450: NO), upper layer processing section 1150 judges either in the beacon waiting slot or out (S6500). If in the beacon waiting slot (S6500: NO), the flow returns to step S6450. If not in the beacon waiting slot (S6500: YES), upper layer processing section 1150 places wideband communication section 1120 to sleep mode (S6250). Then, upper layer processing section 1150 judges whether or not the superframe is finished (S6300). If the superframe is not finished (S6300: NO), upper layer processing section 1150 maintains sleep mode (S6250). If the superframe is finished (S6300: YES), the flow returns to step S6000. Then, narrowband communication section 1130 is placed in tone signal reception waiting mode in the next superframe (S6050). If the beacon is received (S6450: YES), mobile terminal 1100 transmits the data request signal based on the beacon, to access point 1000 (S6550). Upper layer processing section 1550 judges whether or not the data frame is received (S6600). If the data frame is not received (S6600: NO), upper layer processing section 1150 judges either in the data receiving slot or out (S6650). If in the data receiving slot (S6650: NO), the flow returns to step S6600. If the data frame is received (S6600: YES), upper layer processing section 1150 transmits an ACK frame to the access point through wideband communication section 1120 (S6700). After transmitting the ACK frame, the flow returns to step S6000. If not in the data receiving slot (S6650: YES), upper layer processing section 1150 transmits the NACK frame to the access point through wideband communication section 1120 (S6750). After transmitting the NACK frame, upper layer processing section 1150 enters sleep mode (S6250). Then, upper layer processing section 1150 judges whether or not the superframe is finished (S6300). If the superframe is not finished (S6300: NO), upper layer processing section 1150 maintains sleep mode (S6250). If the superframe is finished (S6300: YES), the flow returns to step S6000. Then, narrowband communication section 1130 is placed in tone signal reception waiting mode in the next superframe (S6050).

As described above, mobile terminal 1100 enters mode for successfully receiving a wideband signal only when the tone signal is received, so that it is possible to reduce power consumption.

Embodiment 4

With the above described embodiments, a method of starting frame synchronization inside and outside a group using an unmodulated tone signal with respect to a wideband modulated signal, has been described. However, this method requires a communication section for transmitting and receiving the unmodulated tone signal in addition to a communication section for wideband communication. Therefore, a case will be described with the present embodiment where the tone signal is transmitted and received using a modem (that is, modulator and demodulator) instead of transmitting and receiving the unmodulated tone signal.

Figure 29:
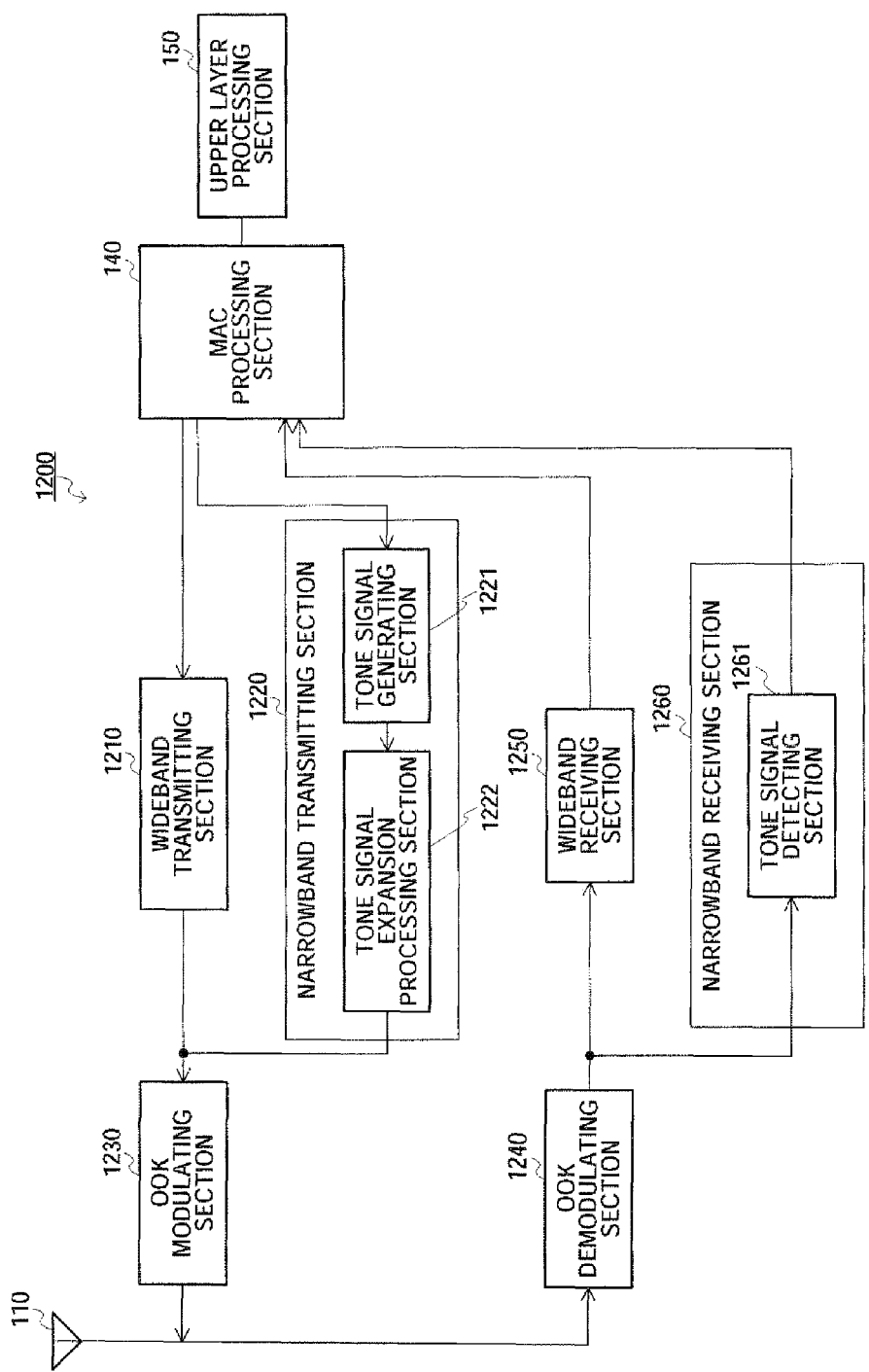
FIG. 29 is a block diagram showing a configuration of the wireless communication apparatus according to Embodiment 4 of the present invention.

FIG. 29 is a block diagram showing a configuration of the wireless communication apparatus according to Embodiment 4 of the present invention. This wireless communication apparatus has the same basic configuration as the corresponding wireless communication apparatus of Embodiment 1 shown in FIG. 3, and the same components will be assigned the same reference numerals and description thereof will be omitted.

Wireless communication apparatus 1200 shown in FIG. 29 has wideband transmitting section 1210, narrowband transmitting section 1220 and OOK (On-Off Keying) modulation section 1230 as the transmission system and OOK demodulation section 1240, wideband receiving section 1250 and narrowband receiving section 1260 as the receiving system. Narrowband transmitting section 1220 has tone signal generating section 1221 and tone signal expansion processing section 1222. Narrowband receiving section 1260 has tone signal detecting section 1261.

Wideband transmitting section 1210 corresponds to the part excluding the modulator from the transmitting system of wideband communication section 120 shown in FIG. 3.

Tone signal generating section 1221 corresponds to the part excluding tone signal expanded transmission section 136 from the transmitting system of narrowband communication section 130 shown in FIG. 3. Tone signal generating section 1221 is controlled by MAC processing section 140 to generate modulated data sequences (hereinafter, "end signals") corresponding to a synchronization tone signal, resynchronization tone signal, probe tone signal, FX probe tone signal and transmission and reception tone signal. Each tone signal is associated in advance with a different modulated data sequence.

Tone signal expansion processing section 1222 transmits an end signal outputted from tone signal generating section 1221 to subsequent OOK modulating section 1230. At this point, similar to the case of Embodiment 1, tone signal expansion processing section 1222 carries out expanded transmission processing with respect to end signals of the synchronization tone signal and resynchronization tone signal.

OOK modulating section 1230 switches an output signal from wideband transmitting section 1210 and an output signal from narrowband transmitting section 1220 (tone signal expansion processing section 1222) as input, carries out OOK modulation with respect to the inputted signal and transmits the modulated signal through antenna 110.

OOK demodulation section 1240 receives the OOK-modulated signal through antenna 110 and OOK-demodulates the received signal.

Wideband receiving section 1250 inputs the wideband signal received at antenna 110 and demodulated in OOK demodulating section 1240, and restores the original data frame from this input signal.

Narrowband receiving section 1260 inputs the narrowband signal received at antenna 110 and demodulated in OOK demodulating section 1240, and detects a tone signal from the inputted signal. Similar to Embodiment 1, subsequent MAC processing section 140 carries out frame synchronization and other processing based on this detected tone signal.

In this way, by transmitting and receiving a tone signal using the modulator and demodulator instead of transmitting and receiving the unmodulated tone signal, it is possible to provide the same advantage as in Embodiment 1.

Figure 30:
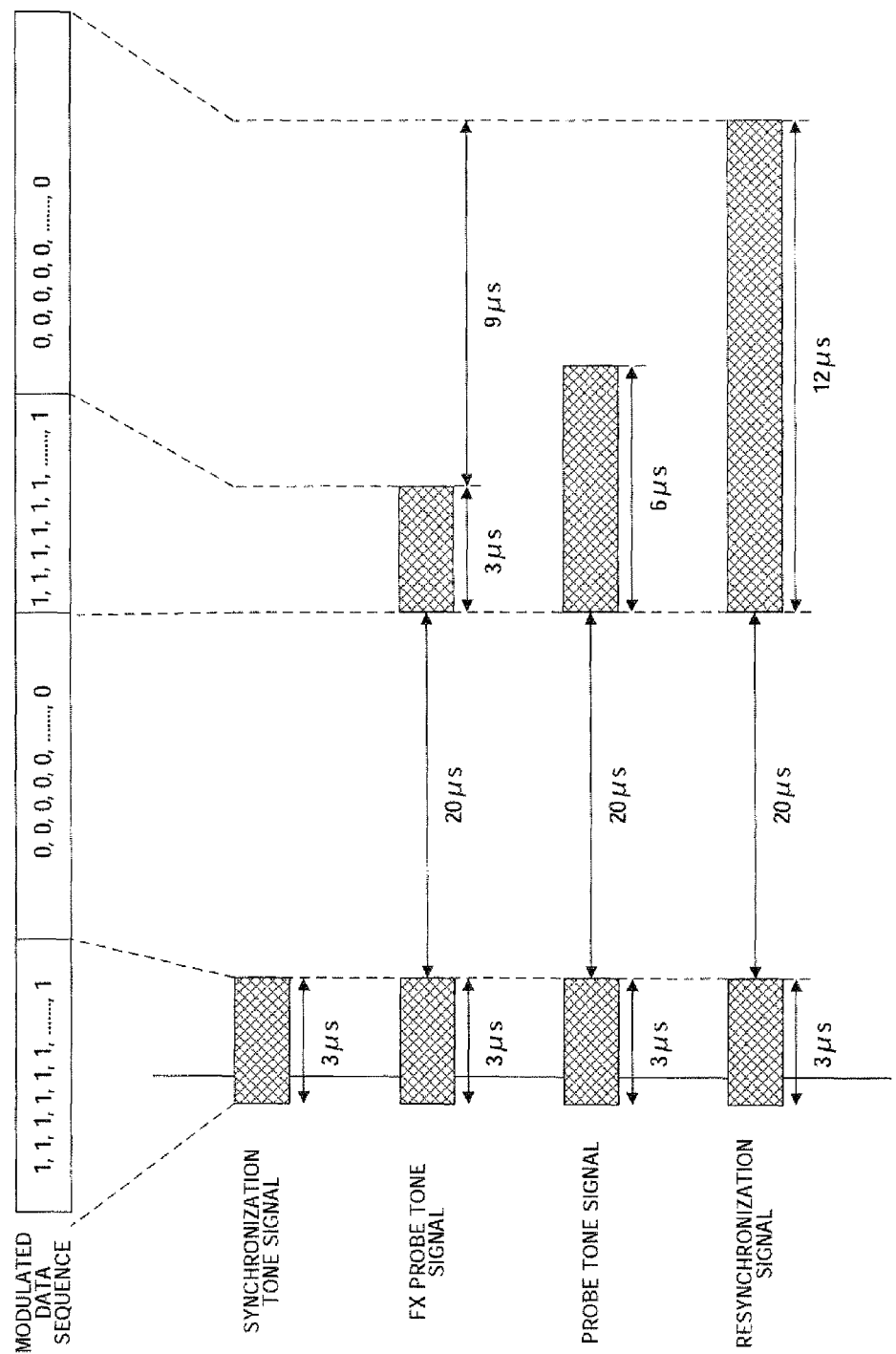
FIG. 30 shows an example of a configuration of modulated data sequences corresponding to various tone signals according to Embodiment 4.

FIG. 30 shows an example of configurations of modulated data sequences corresponding to various tone signals according to the present embodiment. That is, FIG. 30 shows a method of generating tone signals of a synchronization tone signal, FX probe tone signal, probe tone signal and resynchronization tone signal using the OOK modulator.

In FIG. 30, modulated data sequences corresponding to the tone signals are each configured to continuously adopt a value "1" in the duration of a tone shown in FIG. 4 of Embodiment 1 and continuously adopt a value "0" other than in the duration of the tone. In OOK modulation, on and off of a carrier signal is switched depending on data to be modulated. Consequently, by inputting the modulated data sequences of the above configuration to OOK modulation section 1230, signals of "1" are continuously transmitted in a section corresponding to, for example, three micro seconds, and signals of "0" are continuously transmitted in a subsequent section corresponding to twenty microseconds.

In this way, according to the present embodiment, tone signals are transmitted as modulated signals which repeat transmitting a certain modulated numerical value. By this means, without additionally preparing a communication section for transmitting and receiving a unmodulated tone signal, it is possible to transmit a practical tone signal. That is, although, for the configuration of a transceiver of millimeter wave UWB, additionally providing a unmodulation transmitting-receiving section makes the device configuration larger and is likely to cause disadvantage upon mounting, the present embodiment makes it possible to avoid such a disadvantage.

Further, in a wireless system supporting a plurality of different modulation schemes, there is a configuration of varying the center frequency depending on the modulation scheme to be employed. In case of such a configuration, for example, only an end signal transmitting section that transmits an end signal adapted to each center frequency, a carrier sense section that recognizes an end signal adapted to each center frequency and an end signal controlling section that controls an end signal, need to be prepared. The carrier sense section records the head times of the signals and judge whether or not the head times are adequate times by judging these signals are end signals. The end signal controlling section carries out the synchronization operation and resynchronization operation by judging reception times and signal types of these signals and, if necessary, transmits the end signals in the end signal controlling section through the end signal transmitting section and millimeter wave UWB transmitter. By this means, it is possible to acquire synchronization by transmitting the same end signal between a plurality of modulation schemes.

Embodiment 5

A case has been described with Embodiment 4 where tone signals are represented by the duration of the same value in the modulated data sequence. A case will be described with the present embodiment where tone signals are represented by spreading codes (hereinafter simply "codes") in the modulated data sequence.

Figure 31:
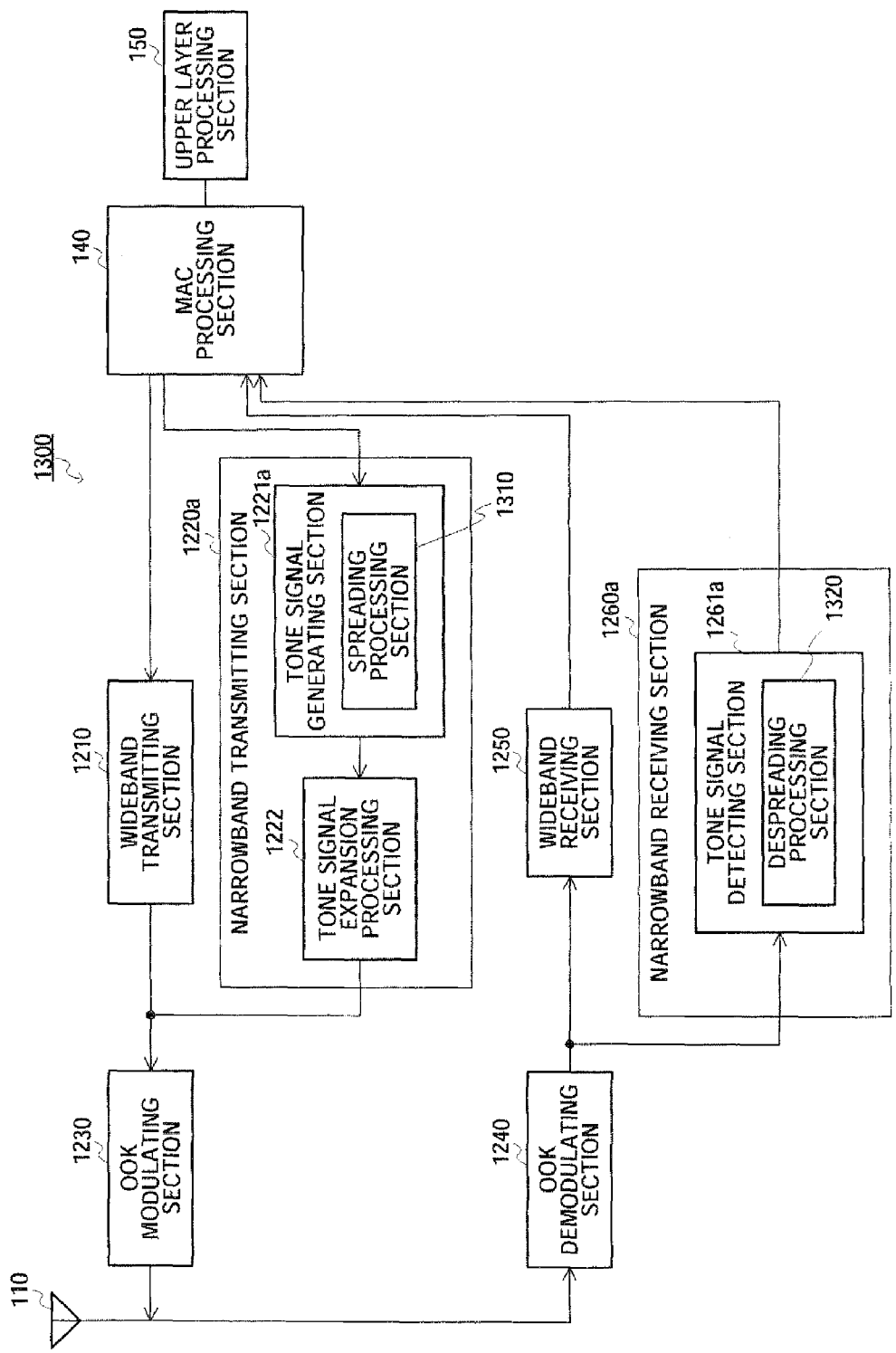
FIG. 31 is a block diagram showing a configuration of the wireless communication apparatus according to Embodiment 5 of the present invention.

FIG. 31 is a block diagram showing a configuration of the wireless communication apparatus according to Embodiment 5 of the present invention. This wireless communication apparatus has the same basic configuration as the corresponding wireless communication apparatus of Embodiment 4 shown in FIG. 29, and the same components will be assigned the same reference numerals and description thereof will be omitted.

In wireless communication apparatus 1300 shown in FIG. 31, tone signal generating section 1221a of narrowband transmitting section 1220a has spreading processing section 1310. Tone signal detecting section 1261a of narrowband receiving section 1260a has despreading processing section 1320.

Spreading processing section 1310 generates code sequences corresponding to a synchronization tone signal, resynchronization tone signal, probe tone signal, FX probe tone signal and transmission and reception tone signal. To be more specific, spreading processing section 1310 generates code sequences using different spreading codes determined in advance for the respective tone signals. Tone signal generating section 1221a outputs code sequences generated in spreading processing section 1310 as end signals.

Despreading processing section 1320 inputs a narrowband signal received at antenna 110 and demodulated in OOK demodulating section 1240 and detects a tone signal by carrying out despreading processing with respect to this input signal.

As described in Embodiment 4, if mutual communication is difficult because the center frequencies are different, although a synchronization method appropriating the carrier sense section is effective, information can be transmitted by the amplitude of a carrier signal. The simplest amplitude modulation scheme is the on off keying (OOK) modulation scheme that has been described.

Figure 32:
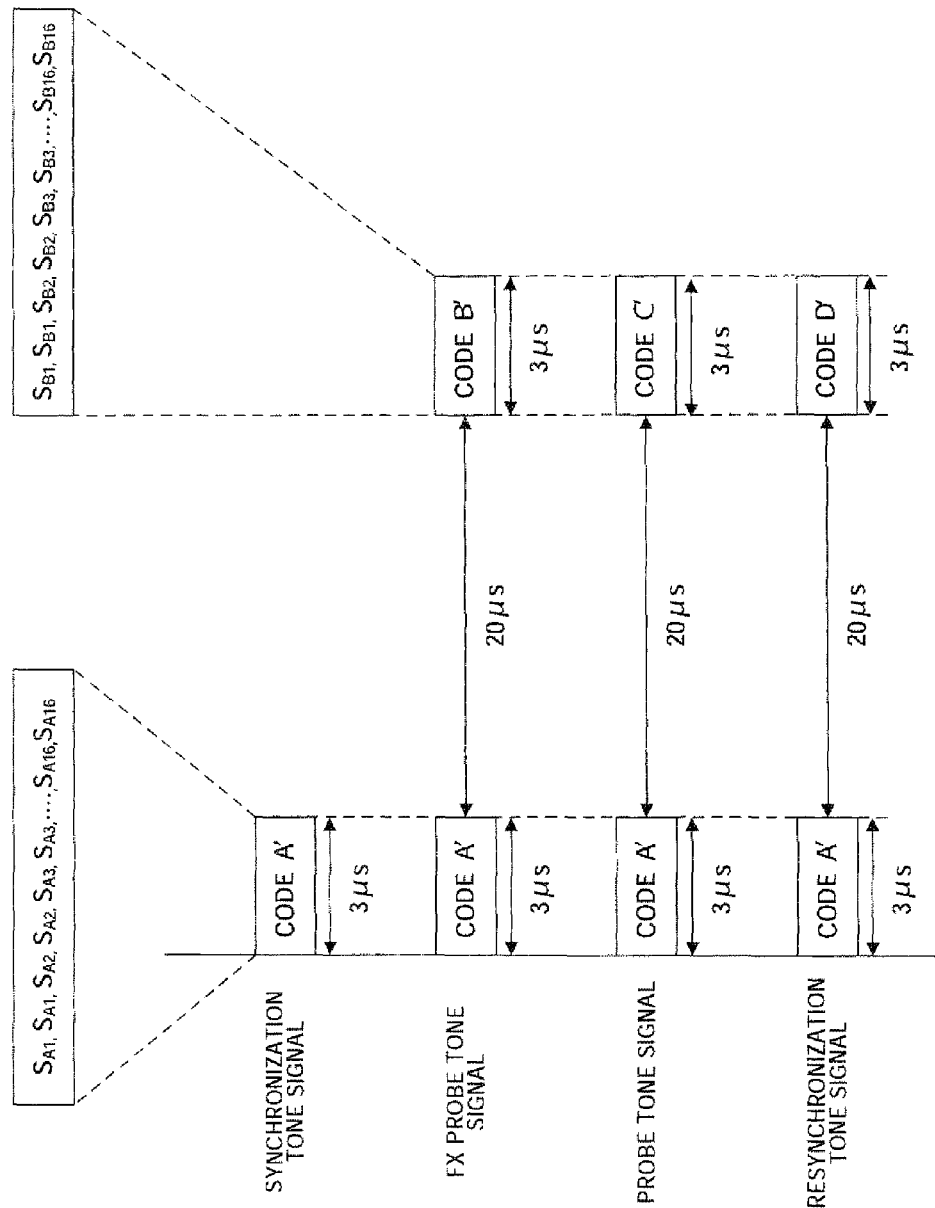
FIG. 32 shows an example of a configuration of code sequences corresponding to various tone signals according to Embodiment 5.

FIG. 32 shows an example of configurations of code sequences corresponding to various tone signals according to the present embodiment. That is, FIG. 32 shows a method of generating tone signals of a synchronization tone signal, FX probe tone signal, probe tone signal and resynchronization tone signal.

In FIG. 32, the code sequences corresponding to the tone signals are configured with different code sequences of the same length. Here, for example, the synchronization tone signal employs a configuration where code sequence A' "$S_{A\ 1}$, $S_{A\ 2}$, $S_{A\ 3}$, . . . , and $S_{A\ 16}$," the code length is sixteen as an example and the same code is aligned twice to increase the redundancy. That is, the synchronization tone signal employs a configuration where the code sequence is "$S_{A\ 1}$, $S_{A\ 1}$, $S_{A\ 2}$, $S_{A\ 2}$, $S_{A\ 3}$, $S_{A\ 3}$, . . . , and $S_{A\ 16}$" and the code length is thirty two as a whole.

Further, for example, the FX probe tone signal is formed with "$S_{B\ 1}$, $S_{B\ 2}$, $S_{B\ 3}$, . . . , and $S_{B\ 16}$." In this case, similar to the synchronization tone signal, the FX probe tone signal is configured with thirty two code length of "$S_{B\ 1}$, $S_{B\ 1}$, $S_{B\ 2}$, $S_{B\ 2}$, $S_{B\ 3}$, $S_{B\ 3}$, . . . , and $S_{B\ 16}$" by aligning the same code twice.

In this way, with the present embodiment, different spreading codes are used to identify the FX probe tone signal, probe tone signal and resynchronization tone signal. By this means, higher speed transmission becomes possible without providing a time lag between tone signals. That is, by repeating transmitting two pulses of "1" or "0" to transmit one code, the bandwidth becomes half and the speed required for signal processing in the receiver becomes almost half, so that lower power consumption is possible. When pulses are transmitted four times repeatedly, the speed required for signal processing becomes a one fourth. When pulses are transmitted eight times repeatedly, the speed required for signal processing becomes a one eighth.

The disclosures of Japanese Patent Application No. 2006-238286, filed on Sep. 1, 2006, Japanese Patent Application No. 2007-060789, filed on Mar. 9, 2007, and Japanese Patent Application No. 2007-225675, filed on Aug. 31, 2007, including the specifications, drawings and abstracts, are incorporated herein by reference in their entirety.

INDUSTRIAL APPLICABILITY

The present invention is useful for a wireless communication apparatus and the like in ad-hoc network environment, particularly, a wireless communication apparatus in a mobile environment, and is suitable for communication as a wireless communication apparatus of an automatic file swapping apparatus and the like.

The invention claimed is:

1. A wireless communication apparatus that carries out wideband communication with another wireless communication apparatus in an ad-hoc network, the wireless communication apparatus comprising:
    a narrowband communication section that transmits and receives a narrowband synchronized signal for realizing superframe synchronization; and a wideband communication section that transmits and receives a wideband data signal used in the wideband communication, wherein the narrowband communication section transmits the narrowband synchronized signal in an output such that a signal reachable range of the narrowband synchronized signal is greater than a signal reachable range of the wideband data signal;

a synchronizing section that acquires synchronization with another superframe group when the narrowband synchronized signal is received from the another wireless communication apparatus; and a probe signal transmitting section that transmits a probe signal for detecting the another wireless communication apparatus when the synchronization with the another superframe group is acquired, wherein the narrowband communication section transmits the narrowband synchronized signal such that the signal reachable radius R of the narrowband synchronized signal satisfies $R=r+vNT$, where T is a superframe period, N is a resynchronization superframe lap count, v is a moving speed of the wireless communication apparatus and r is the signal reachable radius of the wideband data signal.

2. A wireless communication apparatus that carries out wideband communication with another wireless communication apparatus in an ad-hoc network, the wireless communication apparatus comprising:

a narrowband communication section that transmits and receives a narrowband synchronized signal for realizing superframe synchronization; and a wideband communication section that transmits and receives a wideband data signal used in the wideband communication, wherein:

the narrowband communication section transmits the narrowband synchronized signal in an output such that a signal reachable range of the narrowband synchronized signal is greater than a signal reachable range of the wideband data signal, the probe signal transmitting section transmits the probe signal such that a signal reachable range of the probe signal is equal to the signal reachable range of the wideband data signal, the narrowband synchronized signal is comprised of a synchronization tone signal for synchronization control and a resynchronization tone signal for resynchronization, the probe tone signal is comprised of a probe tone signal for probing a neighboring wireless communication terminal and an file exchange probe tone signal for probing a wireless communication terminal to swap files with, and the synchronization tone signal, the resynchronization tone signal, the probe tone signal and the file exchange probe tone signal are each configured with a duration of a tone signal and an intermittent pattern.

3. The wireless communication apparatus according to claim 2, wherein:

the file exchange probe tone signal is configured by, when a predetermined period passes, transmitting a tone signal comprising a first duration after the synchronization tone signal is transmitted;

the probe tone signal is configured by, when the predetermined period passes, transmitting a tone signal comprising a second duration longer than the first duration after the synchronization tone signal is transmitted; and the resynchronization tone signal is configured by, when the predetermined period passes, transmitting a tone signal comprising a third duration longer than the second duration after the synchronization tone signal is transmitted.

4. A wireless communication apparatus that carries out wideband communication with another wireless communication apparatus in an ad-hoc network, the wireless communication apparatus comprising:

a narrowband communication section that transmits and receives a narrowband synchronized signal for realizing superframe synchronization; and a wideband communication section that transmits and receives a wideband data signal used in the wideband communication, wherein the narrowband communication section transmits the narrowband synchronized signal in an output such that a signal reachable range of the narrowband synchronized signal is greater than a signal reachable range of the wideband data signal;

a synchronizing section that acquires synchronization with another superframe group when the narrowband synchronized signal is received from the another wireless communication apparatus; and a beacon period moving section that, when the synchronization with the another superframe group is acquired, moves a beacon period of a superframe group of the wireless communication apparatus to another offset position in a superframe after the synchronization.

5. The wireless communication apparatus according to claim 4, wherein the narrowband synchronized signal and the probe signal comprise unmodulated tone signals.

6. The wireless communication apparatus according to claim 4, further comprising:

a detecting section that, if the movement to the offset position does not take place, detects whether or not there is an upper empty beacon slot in an original beacon period; and an evacuating section that, if there is the upper empty beacon slot in the original beacon period, moves a beacon slot position of the wireless communication apparatus to the upper empty beacon slot.

7. The wireless communication apparatus according to claim 4, wherein:

the wideband communication section and the narrowband communication section further comprise an on-off keying modulator and demodulator shared between the wideband communication section and the narrowband communication section; and the narrowband communication section transmits and receives the narrowband synchronized signal using a binary signal.

8. The wireless communication apparatus according to claim 4, wherein:

the wideband communication section and the narrowband communication section further comprise an on-off keying modulator and demodulator shared between the wideband communication section and the narrowband communication section; and the narrowband communication section transmits and receives the narrowband synchronized signal using a signal spread by a predetermined spreading code.

* * * * *